Nov. 12, 1968  W. S. JOHNSON  3,410,931
METHOD AND APPARATUS FOR MAKING LAMINATED PANELS OF
POLYSTYRENE FOAM AND ALUMINUM
Filed Oct. 11, 1963  19 Sheets-Sheet 1

FIG. I

INVENTOR.
WILBERT S. JOHNSON
BY
J. William Freeman
ATTORNEY

INVENTOR.
WILBERT S. JOHNSON
BY
ATTORNEY

INVENTOR.
WILBERT S. JOHNSON
BY
ATTORNEY

Nov. 12, 1968   W. S. JOHNSON   3,410,931
METHOD AND APPARATUS FOR MAKING LAMINATED PANELS OF
POLYSTYRENE FOAM AND ALUMINUM
Filed Oct. 11, 1963   19 Sheets-Sheet 7

INVENTOR.
WILBERT S. JOHNSON

BY

ATTORNEY

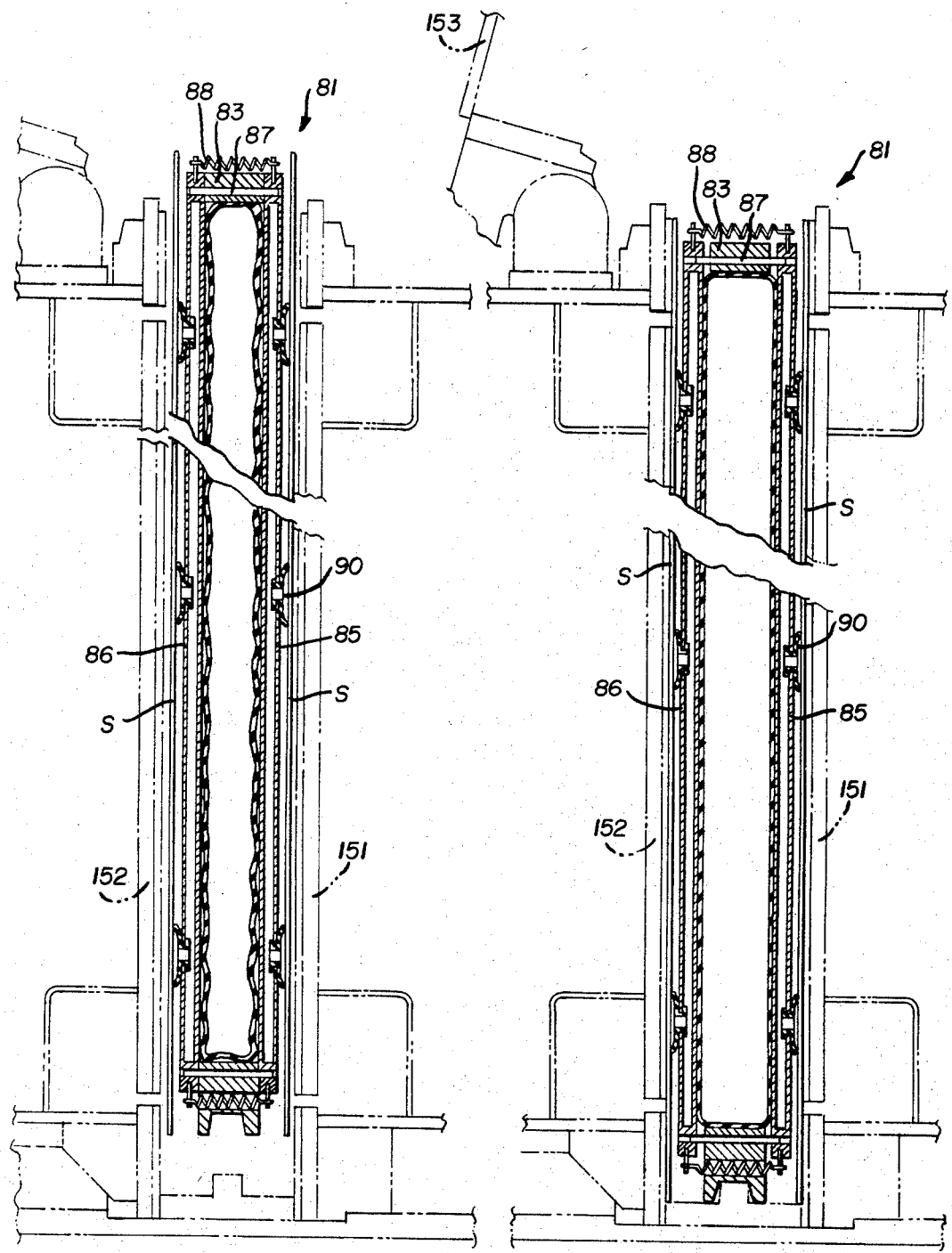

Nov. 12, 1968 W. S. JOHNSON 3,410,931
METHOD AND APPARATUS FOR MAKING LAMINATED PANELS OF
POLYSTYRENE FOAM AND ALUMINUM
Filed Oct. 11, 1963 19 Sheets-Sheet 9

INVENTOR.
WILBERT S. JOHNSON
BY
ATTORNEY

Nov. 12, 1968 W. S. JOHNSON 3,410,931
METHOD AND APPARATUS FOR MAKING LAMINATED PANELS OF
POLYSTYRENE FOAM AND ALUMINUM
Filed Oct. 11, 1963 19 Sheets-Sheet 10

INVENTOR.
WILBERT S. JOHNSON
BY
ATTORNEY

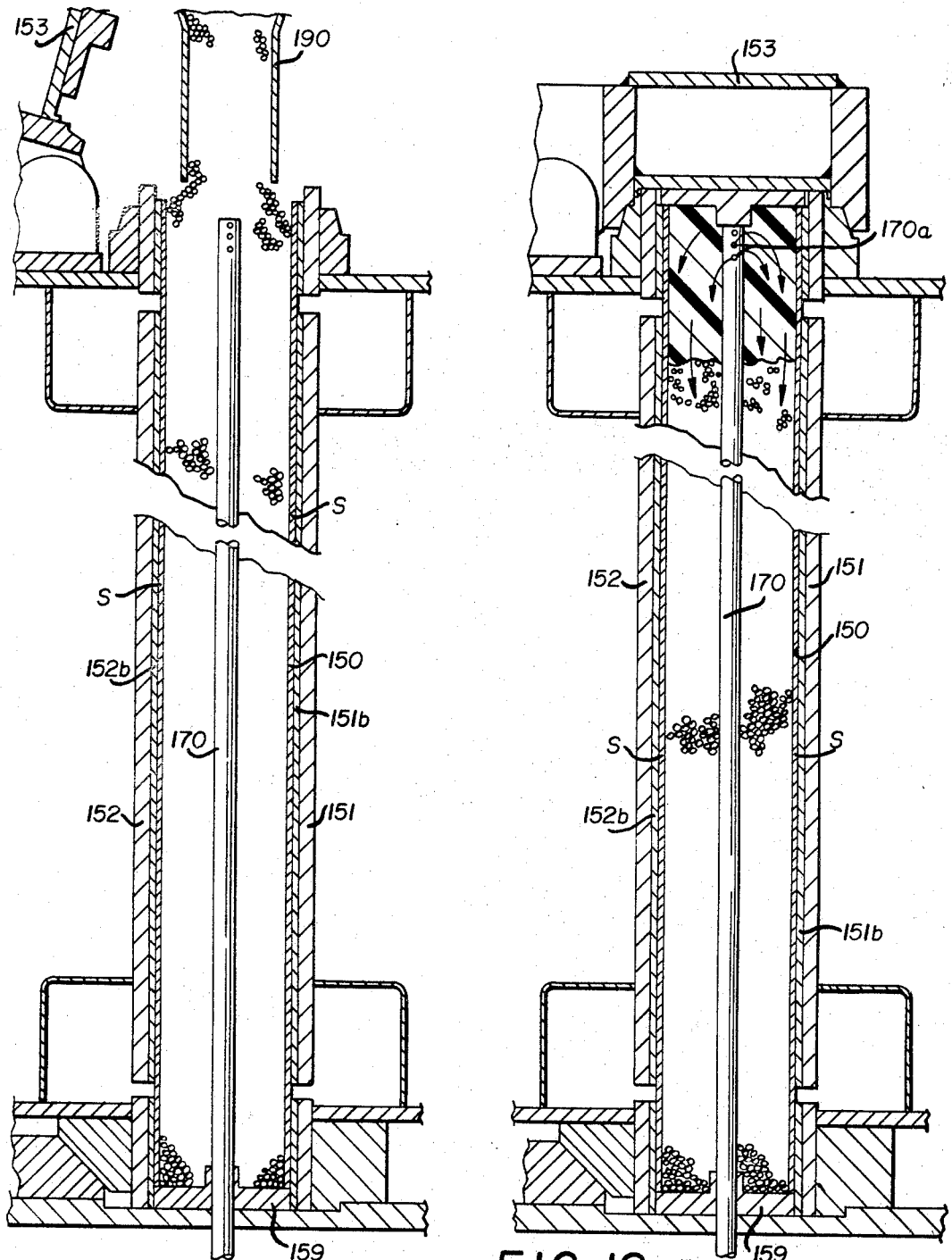

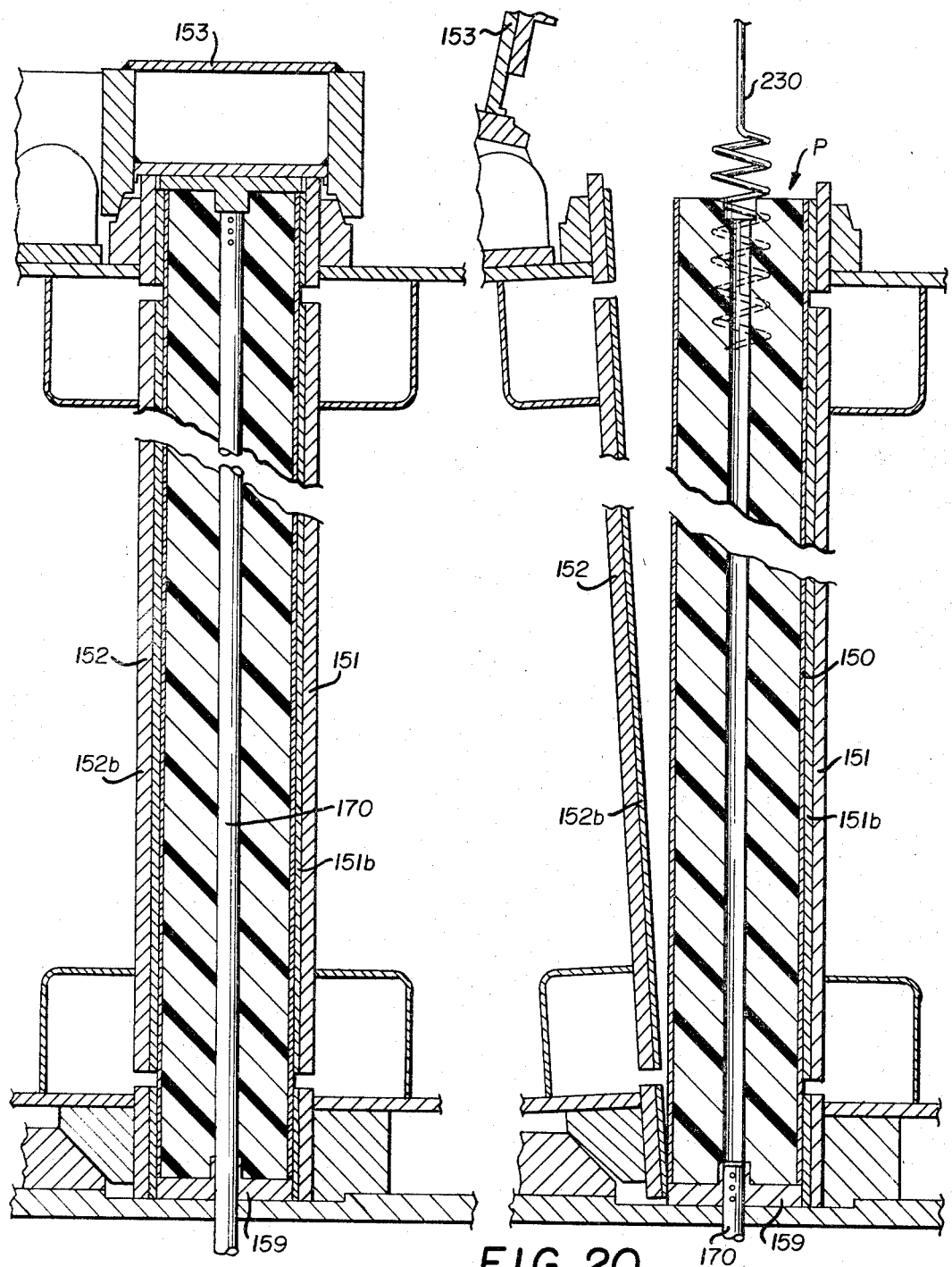

Nov. 12, 1968  W. S. JOHNSON  3,410,931
METHOD AND APPARATUS FOR MAKING LAMINATED PANELS OF
POLYSTYRENE FOAM AND ALUMINUM
Filed Oct. 11, 1963  19 Sheets-Sheet 13
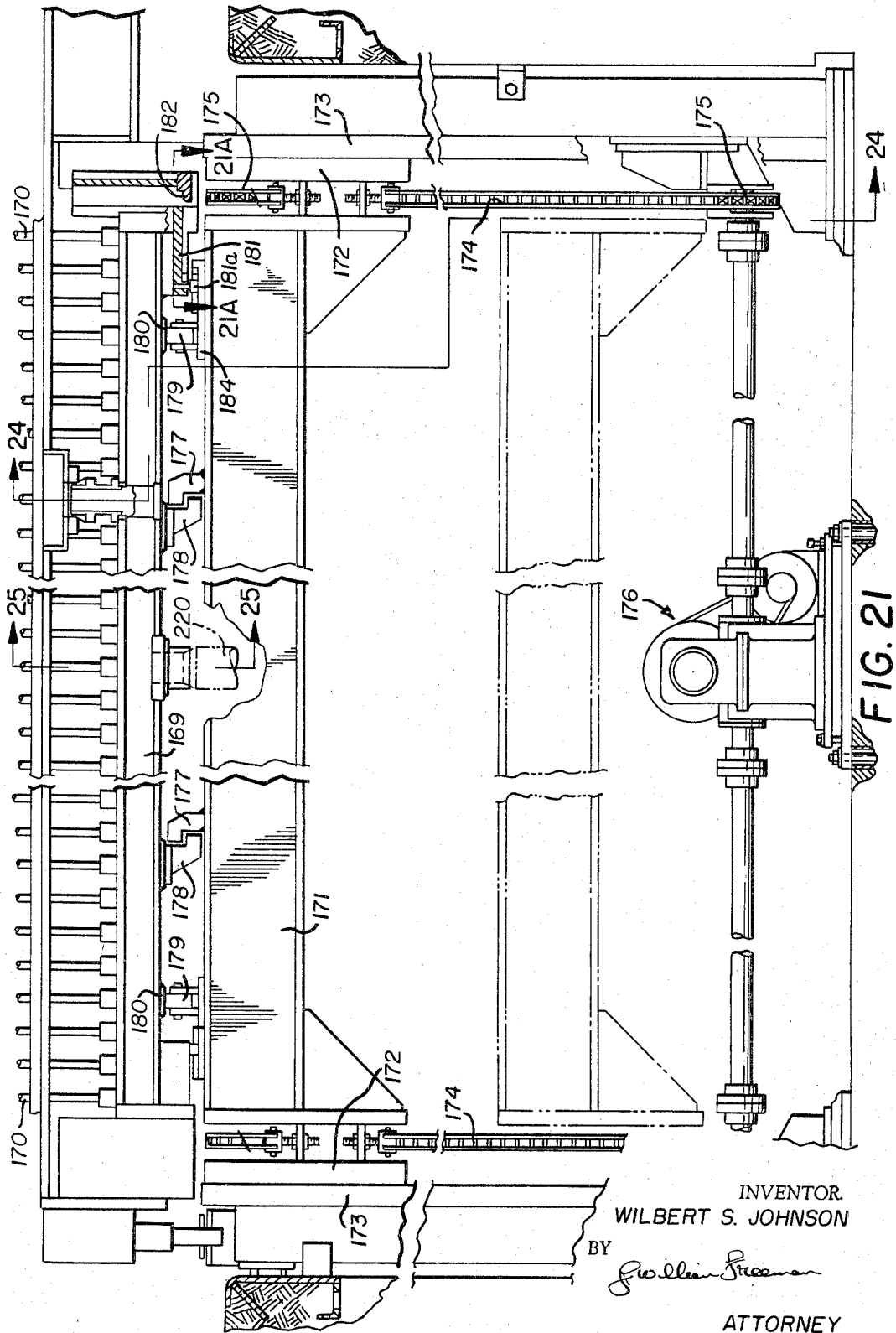
INVENTOR.
WILBERT S. JOHNSON
BY
ATTORNEY Nov. 12, 1968    W. S. JOHNSON    3,410,931
METHOD AND APPARATUS FOR MAKING LAMINATED PANELS OF
POLYSTYRENE FOAM AND ALUMINUM
Filed Oct. 11, 1963    19 Sheets-Sheet 14

INVENTOR.
WILBERT S. JOHNSON
BY
ATTORNEY

Nov. 12, 1968    W. S. JOHNSON    3,410,931
METHOD AND APPARATUS FOR MAKING LAMINATED PANELS OF
POLYSTYRENE FOAM AND ALUMINUM
Filed Oct. 11, 1963    19 Sheets-Sheet 15

INVENTOR.
WILBERT S. JOHNSON
BY
ATTORNEY

Nov. 12, 1968  W. S. JOHNSON  3,410,931
METHOD AND APPARATUS FOR MAKING LAMINATED PANELS OF
POLYSTYRENE FOAM AND ALUMINUM
Filed Oct. 11, 1963  19 Sheets-Sheet 16

INVENTOR.
WILBERT S. JOHNSON
BY
ATTORNEY

Nov. 12, 1968  W. S. JOHNSON  3,410,931
METHOD AND APPARATUS FOR MAKING LAMINATED PANELS OF
POLYSTYRENE FOAM AND ALUMINUM
Filed Oct. 11, 1963  19 Sheets-Sheet 17

INVENTOR.
WILBERT S. JOHNSON
BY
ATTORNEY

INVENTOR.
WILBERT S. JOHNSON

ATTORNEY

United States Patent Office 3,410,931
Patented Nov. 12, 1968

3,410,931
METHOD AND APPARATUS FOR MAKING LAMINATED PANELS OF POLYSTYRENE FOAM AND ALUMINUM
Wilbert S. Johnson, Cuyahoga Falls, Ohio, assignor, by mesne assignments, to Alside, Inc., a corporation of Ohio
Filed Oct. 11, 1963, Ser. No. 315,511
4 Claims. (Cl. 264—45)

(A) SUBJECT MATTER

This invention relates to the art of manufacturing laminated panel sections and in particular relates to a method and apparatus for making a foamed polymeric block of panel shape that has its major planar surfaces covered with sheets of aluminum that are bonded in place thereon during foaming.

(B) USE

In the pending U.S. patent application of Emil A. Tessin, II, filed June 27, 1962, as Ser. No. 205,779, and entitled "Modular House Having Dividing Component Walls Dimensioned in Correlation with The Modular Dimension," now Patent No. 3,245,183, there is disclosed a modular type of prefabricated house that features the use of a repetitive building module that defines a living area that is bounded by exterior panels. The method and apparatus herein disclosed produces a laminated panel having particular utility for use as such an exterior panel.

(C) PRIOR ART

With reference to the manufacture of panel structures that utilize a core of foamed polymeric materials such as polystyrene, it has been known in such art that such core materials can be made by pouring polymeric material in its preexpanded form into a closed mold cavity followed by the application of steam against said preexpanded material to result in rapid expansion thereof into a rigid structure that possesses high insulation properties.

Representative patents showing the state of such art are: Edberg, U.S. Patent 3,042,967, issued July 10, 1963; Brockhause et al., U.S. Patent 3,042,973, issued July 10, 1963; Merz, U.S. Patent 2,806,812, issued Sept. 17, 1957; Pace, U.S. Patent 2,744,042, issued May 1, 1956; Wilson, U.S. Patent 2,674,775, issued Apr. 13, 1954; Lubenow, U.S. Patent 2,661,496, issued Dec. 8, 1953.

While the prior art above enumerated teaches basic foaming techniques, it has been discovered that panels of the type desired can be achieved on a production basis by incorporating several improvements into the above prior art teachings.

Specifically, it has been found that if the steaming pipes are permitted to remain in place during the entire operation, a core of more uniform density will be obtained. In the prior art, and particularly in the Edberg patent above enumerated, the probing units are withdrawn during manufacture, with the result that the voids created by such withdrawal are only incompletely filled with the bead material, with the result that the density of the core in the region wherein the probe has been withdrawn is less than the over-all density. Such a condition results frequently in buckling of the skin material.

It has been further found important to carefully prepare the mold walls that will receive the aluminum skin members, with these mold walls being covered first with an insulating liner of reinforcing material such as "Glastic"[1] that is in turn covered with a thin film of an epoxy material such as "Kemak."[2]

[1] "Glastic" is a trademark of the Glastic Corporation and designates a fiberglass reinforced polyester liner material.
[2] "Kemak" is a registered trademark of Sherwin-Williams Corporation to designate an epoxy resin that dries to a machine tool finish.

The purpose of the insulating material above captioned is to prevent the aluminum skin member from dissipating heat into the relatively cold mold wall so that the skin will have a high enough temperature to properly bond to the expanded bead material. Stated otherwise, the glue line (the point of bonding between the skins and the beads) must be at the proper temperature to reactivate the bonding material that has been provided on the skins. Accordingly, if provision were not made to insulate the mold wall, there would be insufficient temperature at the glue line.

With reference to the epoxy film, it is apparent that the same is provided for the purpose of presenting a low-friction surface so that the aluminum skin may accordingly "thermally expand" during heating without buckling, with the epoxy permitting the aluminum skin to slide relatively of the mold surface while retaining its planar position, with such sliding occurring notwithstanding the tremendous forces that are applied by the beads to force the aluminum skin against the mold wall.

With the above improvements, it has been found that perfect panels can be achieved on a production basis.

(D) OBJECTS

Development of a method and apparatus for producing such laminated panels on a mass production, repetitive type basis accordingly becomes the principal object of this invention, with other objects of this invention becoming more apparent upon a consideration of the following specification, considered and interpreted in the light of the accompanying drawings.

(E) DESCRIPTION OF DRAWINGS

Of the drawings:

FIGURE 12 is a view similar to FIGURES 10 and 11, but showing the vacuum loader entering the appropriate curing mold of the panel making machine that is positioned at the loading station.

FIGURE 13 is a view similar to FIGURE 12, but showing the vacuum loader expanded against the walls of the curing mold for positioning of the aluminum skins against the opposed wall of the curing mold.

FIGURES 17, 18, 19 and 20 are sectional views taken on the lines 17—17, 18—18, 19—19, 20—20 of FIGURE 3 and showing the close sectional profile of the curing mold at the beading, steaming, curing and unloading stations respectively.

FIGURE 21 is a sectional view taken on the lines 21—21 of FIGURE 2 and showing the driving means for raising and lowering the steam core units that are inserted into the curing mold during the operating cycle.

FIGURE 21a is an enlarged sectional view of the locking cam in unlocked position taken on the lines 21a—21a of FIGURE 21, while

Figure 24:
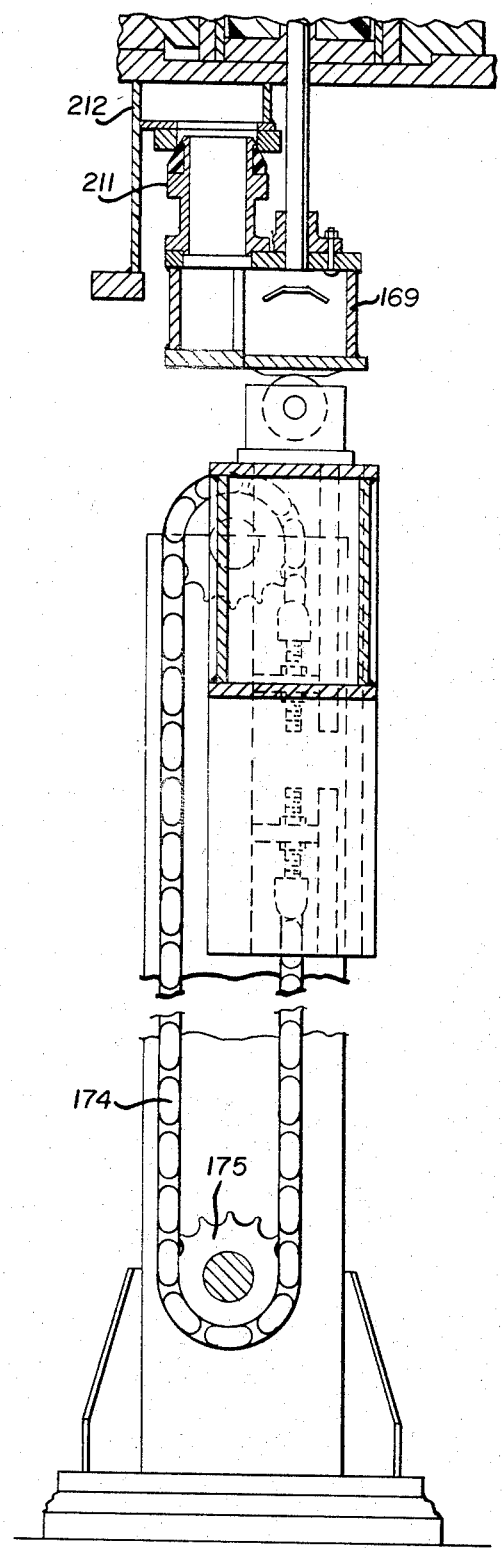
Figure 25:
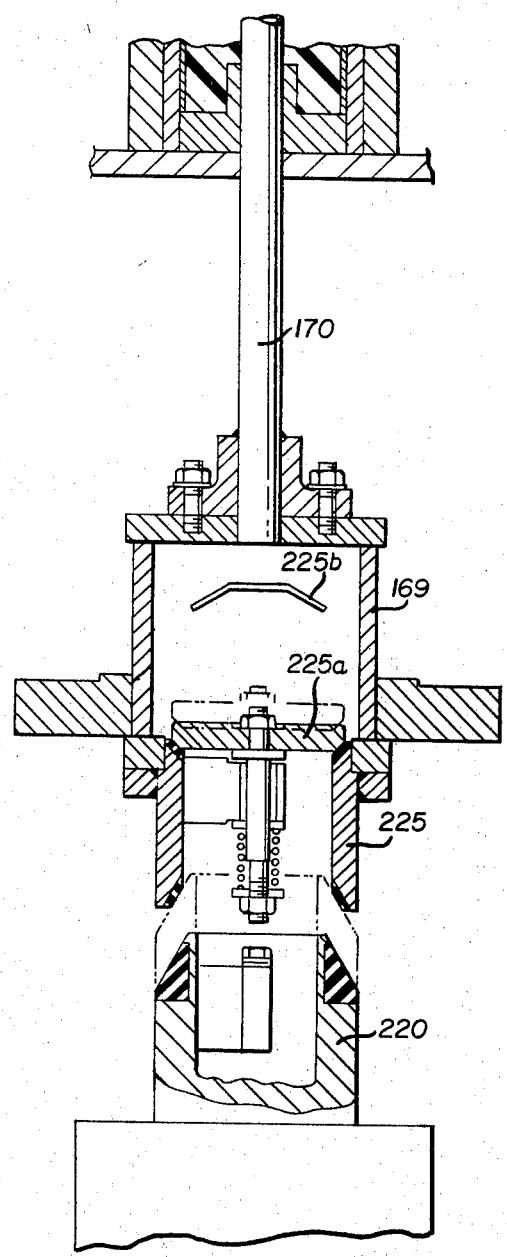

FIGURES 24 and 25 are vertical sections taken on the lines 24—24 and 25—25 of FIGURE 21.

Figure 4:
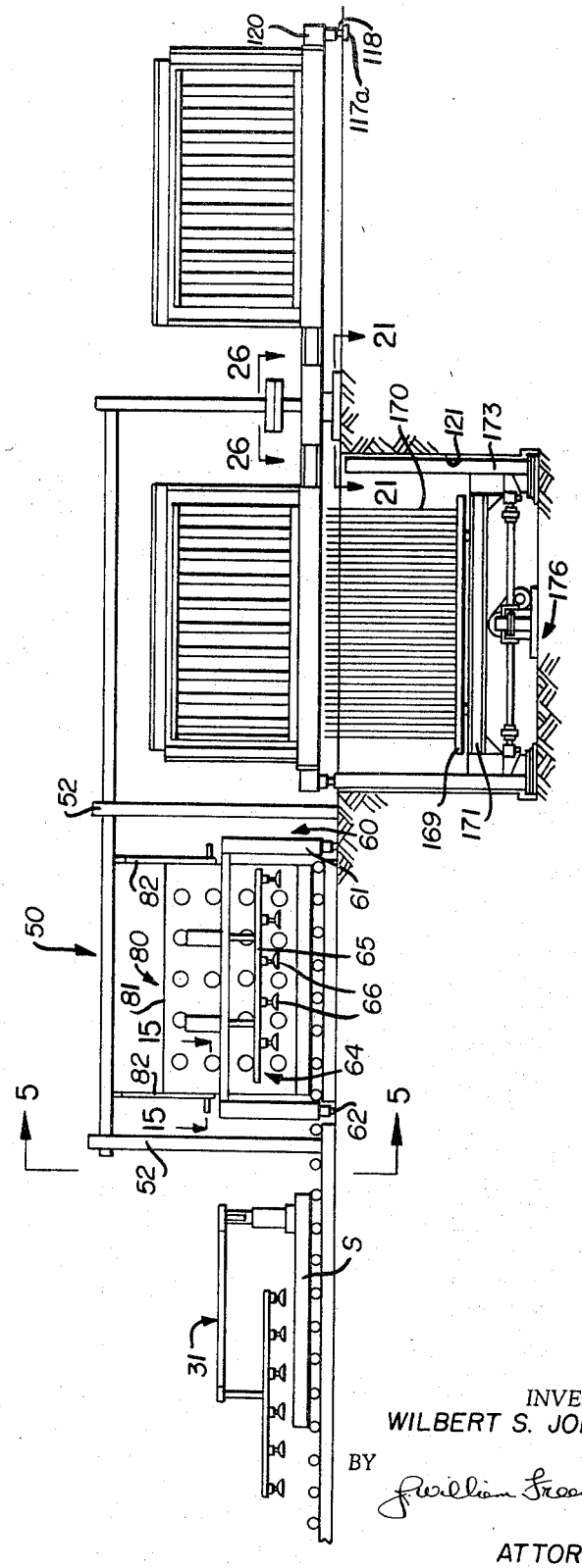
FIGURE 4 is a vertical elevation taken on the lines 4—4 of FIGURE 3.
Figure 26:
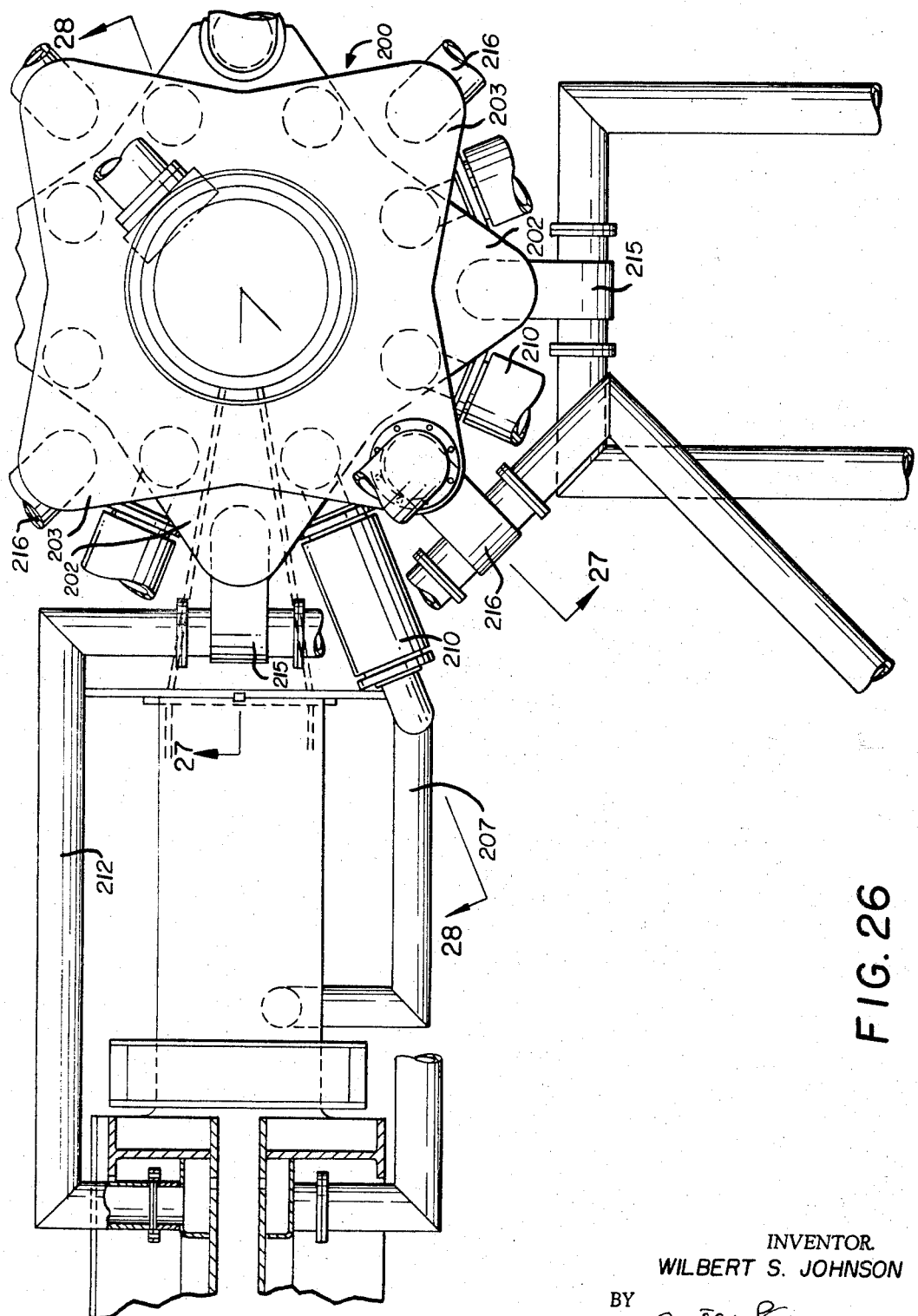

FIGURE 26 is a sectional view taken on the lines 26—26 of FIGURE 4 and showing the vacuum chambers in plan.

Figure 27:
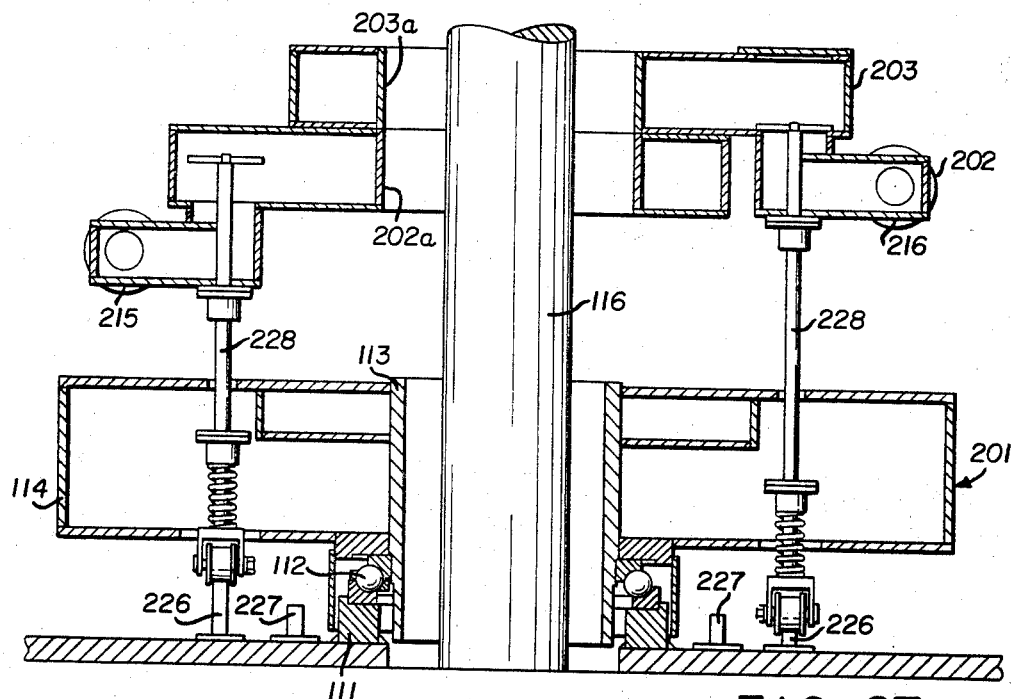
Figure 28:
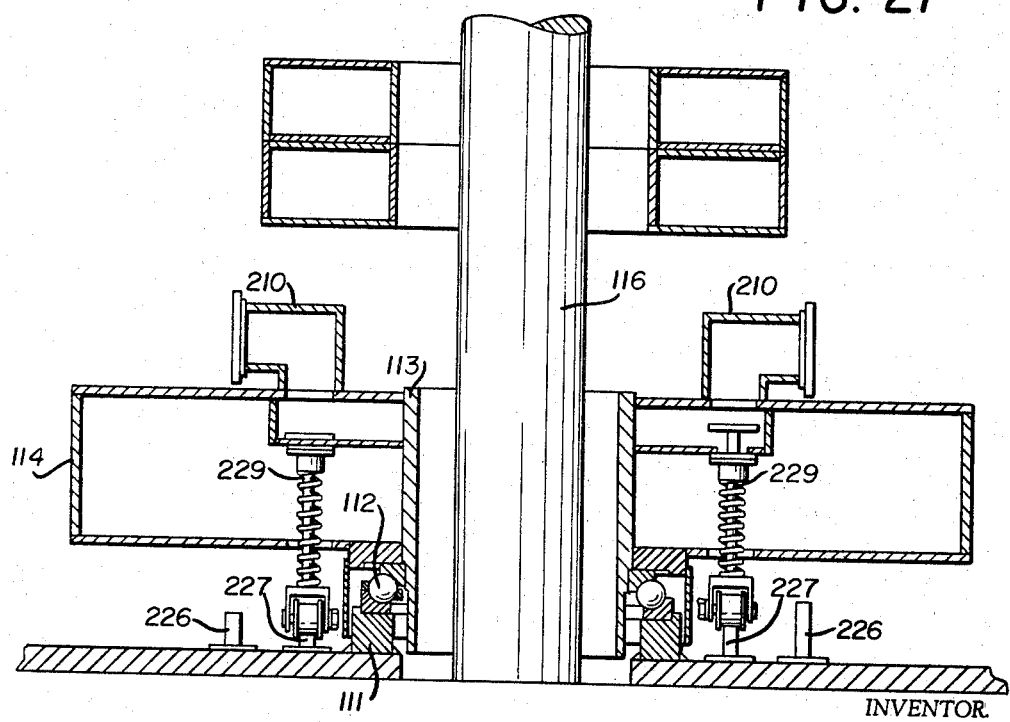

FIGURES 27 and 28 are vertical sections taken on the lines 27—27 and 28—28 of FIGURE 26.

Figure 29:
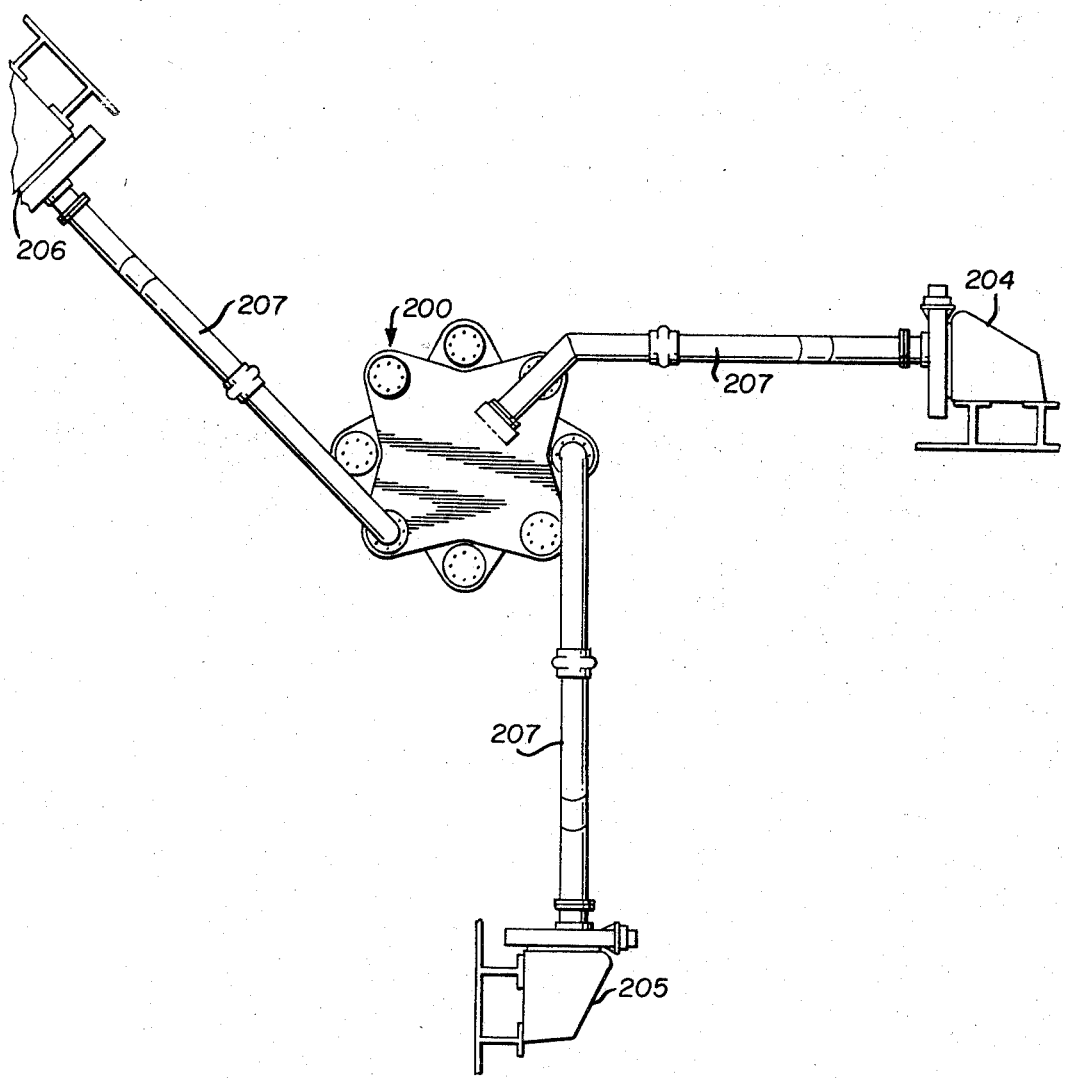

FIGURE 29 is a schematic plan view of the over-all vacuum supply unit.

Figure 30:
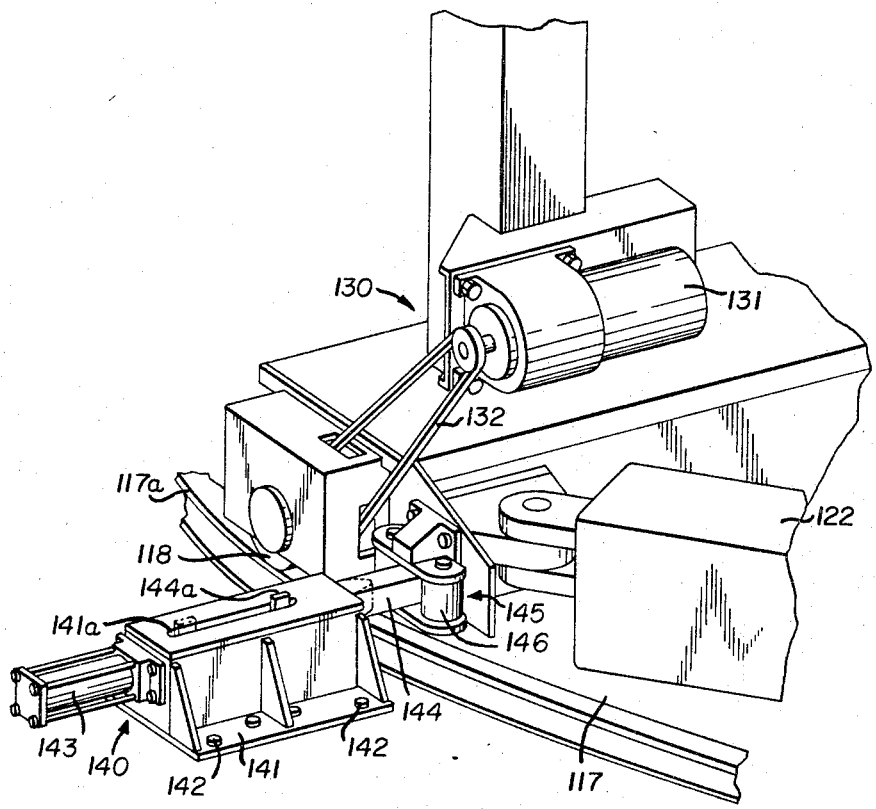

FIGURE 30 is a perspective view of the drive means and the registering mechanism.

(F) GENERAL DESCRIPTION

In essence, the improved method and apparatus for making laminated panels of the type above described envisions the use of a continuous type of conveyor system that serves to transport flat thin sheets of aluminum stock in flat form through certain preparation operations prior to delivery of the same to a loading device 50, with the surface treatment just described including the application of a prime coat to one face of the aluminum skin in question, while the remaining face thereof is provided with a bonding material that will subsequently be reactivated to bond the skin to the expanded polymeric core during the panel-making operation.

The loading device 50 serves the function of arranging a pair of skin members S, S in parallel, upright spaced relationship to each other, whereupon such skin members can be inserted, while in such spaced relationship, into the curing mold of the panel machine 100, with the operation of the panel machine being such that the void between the spaced skins S is filled with pre-expanded polymeric material in its beaded form, followed by a steam injection operation through inserted steam cores, with such last mentioned operation serving to further expand the beaded material into expanded form whereby a core is formed between the aluminum skins.

By making the panel machine of "merry-go-round" type of construction, wherein eight radiating arms each carrying an identical curing mold are provided, it will be seen that while a curing mold of one arm is being loaded, the beading, steam curing, and cooling operations can be simultaneously carried on in the remaining arms with the result that during each complete rotation of the panel machine 100 a total of eight panels P will be produced.

Panels so produced in the panel machine 100 will then be subsequently unloaded into an overhead conveyor system for such final treatment as is required, including final painting, sawing, and storage.

(G) SPECIFIC DESCRIPTION

(a) The over-all production line

Figure 1:
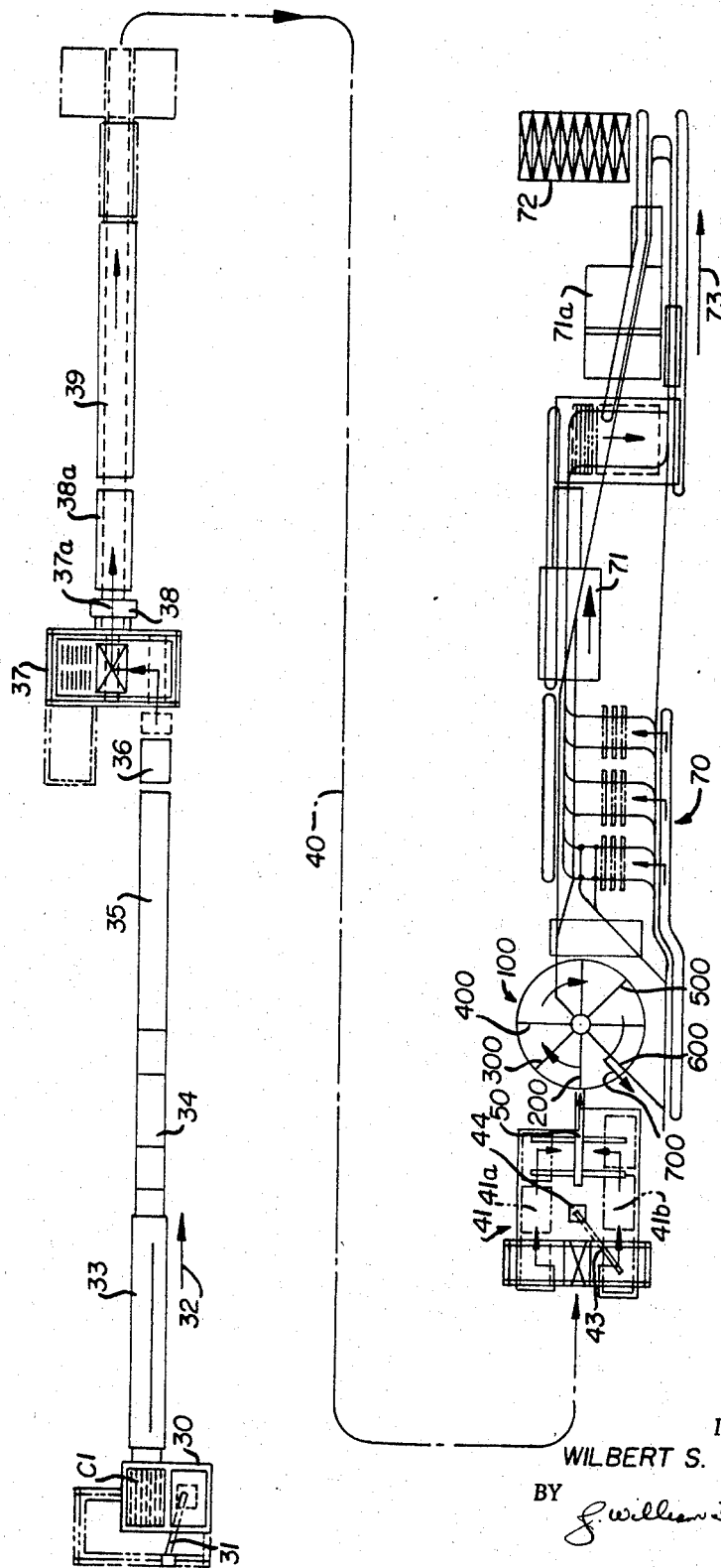
FIGURE 1 is a schematic layout of the production line equipment utilized in the manufacture of the improved laminated panel.

The over-all production line is best shown in FIGURE 1 of the drawings, where skins S, received from stock, are first placed on one or more appropriate storage racks 30 from which the same may be transferred to the conveyor station C₁ by use of a bridge crane 31. Skins S so received on the conveyor surface C₁ will be moved in the direction of arrow 32 to a surface preparation station 33, that cleans the surface and prepares the same for reception of a prime paint coat at spray booth 34, with the primed skins then moving through bake oven 35 and quenching area 36 to thus provide a prime coat on one surface of the skin S. This painted surface, as it approaches turn-over unit 37, is facing upwardly and by use of the usual suction turn-over devices provided in turn-over unit 37, the skin S will be rotated 180 degrees and thence emitted in the direction of the arrow 37a for application of an adhesive bonding coat at station 38, with the excess coating being flushed off at station 38a followed by baking at station 39.

Although the schematic view of FIGURE 1 shows upper and lower portions, it is to be understood that the over-all line is basically one continuous straight line operation as is indicated by the arrow 40 of FIGURE 1.

Accordingly, skins thus primed on one side and adhesively coated on the other side enter a separation area 41 from whence the same are divided accordingly to length, with 12′ x 8′ skins being shown stored on upper rack 41a, while 14′ x 12′ skins are shown stored on lower rack 41b.

To this end, a bridge crane 43, having the usual suction pick-up means and being pivoted as at 44, is adaptable to selectively position the panels on storage conveyors 41a or 41b dependent upon the length of the skins that approach the separating station 41.

Aluminum skin members so prime coated and sorted, are now in the storage position for delivery to the loading device 50 as will now be described, with this condition of storage being generally illustrated in FIGURE 2 and being further shown in plan in FIGURE 3 of the drawings.

(b) The loading device 50

Figure 2:
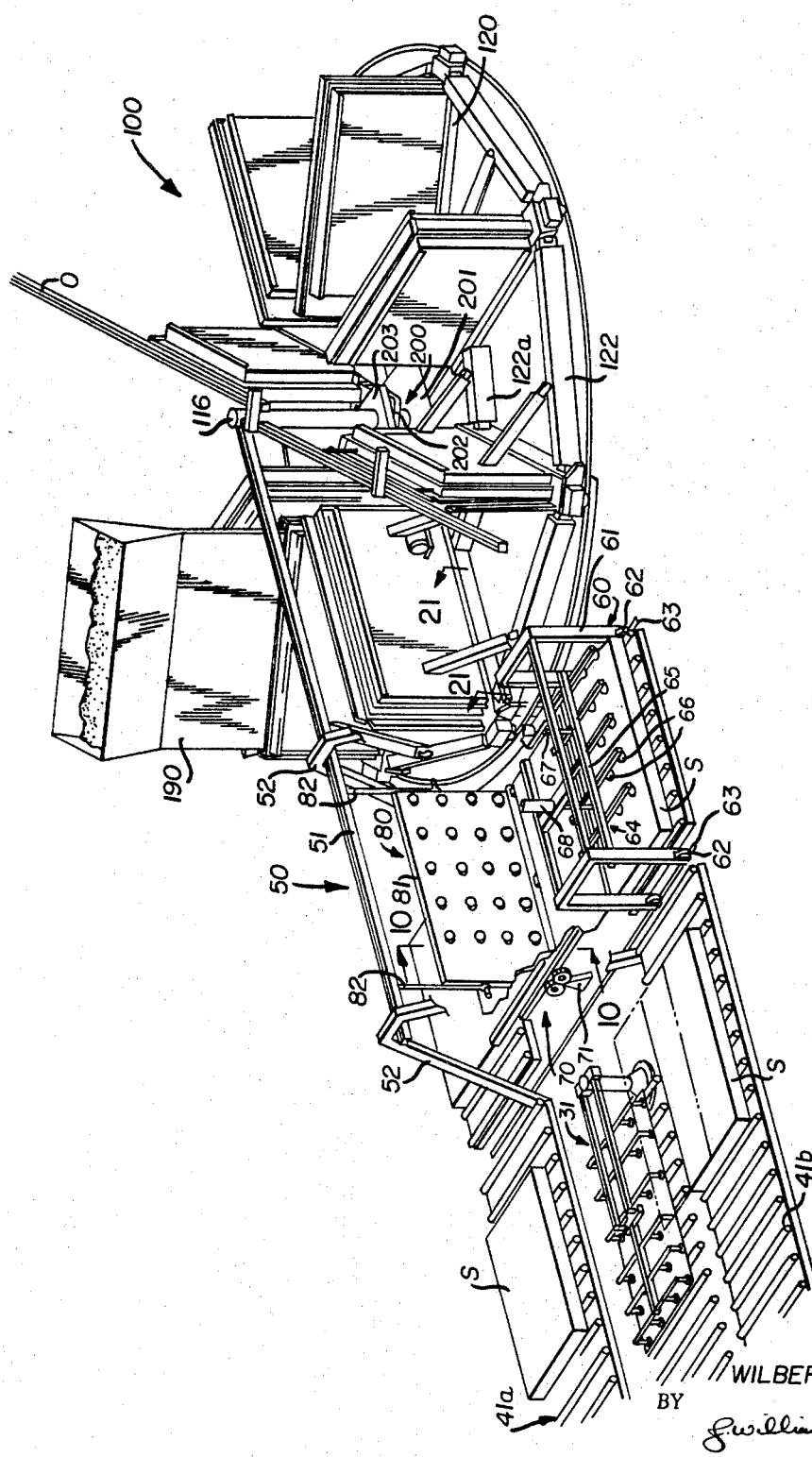
FIGURE 2 is a perspective view of the improved panel making machine and the loading apparatus therefor.
Figure 3:
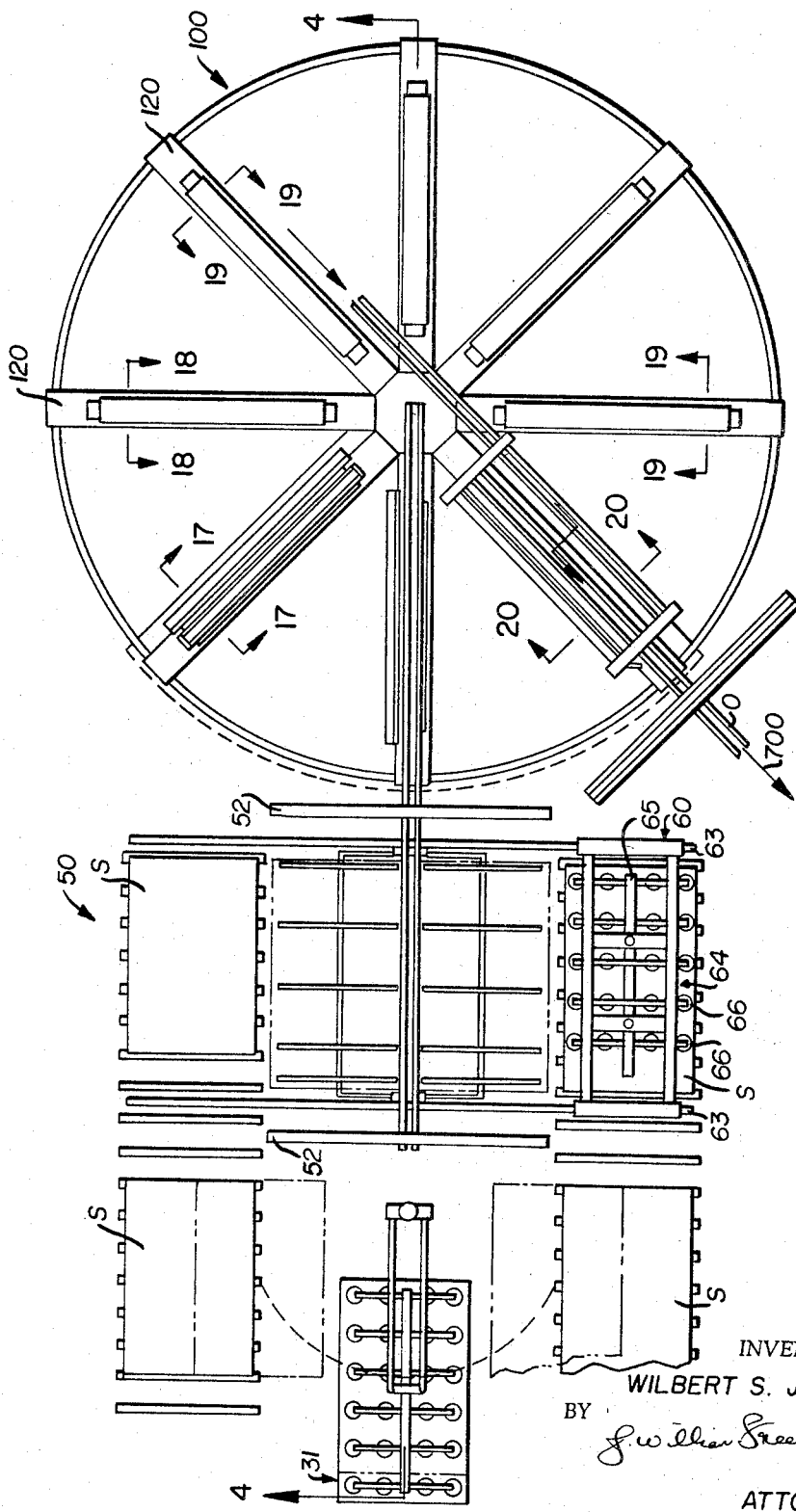
FIGURE 3 is a plan view of the mechanism shown in FIGURE 2.

The loading device 50 is best shown in FIGURES 2 through 9 of the drawings, and referring first to FIGURE 2, it will be noted that the same includes a transfer crane 60 that serves to supply skin members S to the opposed arms of a flipper unit 70, that in turn takes the skin members so received and positions the same in upright position, whereupon the same may be received by the opposed faces of a vacuum loader 80 that will reciprocate into and out of the curing mold that is positioned at the loading position of panel machine 100 as viewed in FIGURES 2 and 3 of the drawings.

Considering first the structure of the transfer crane 60 and referring first to FIGURE 2, it will be noted that the crane 60 includes an upright frame 61 that has wheel elements 62, 62 that permit movement across guide tracks 63, 63, with this arrangement facilitating movement of the crane 60 to the various positions that are shown in FIGURES 6 through 9 inclusive.

For the purpose of picking up the skin members S, the crane 60 shiftably suports a vacuum pick-up unit 64 that includes a frame work 65 from which depend suction cups 66, with suction being applied to the vacuum cup 66 through a flexible conduit 67 in known manner, and with shifting movement of the vacuum pickup unit 64 relatively of frame 61 being achieved by the usual hydraulic cylinder 68, as schematically shown in FIGURE 2 of the drawings.

Figure 5:
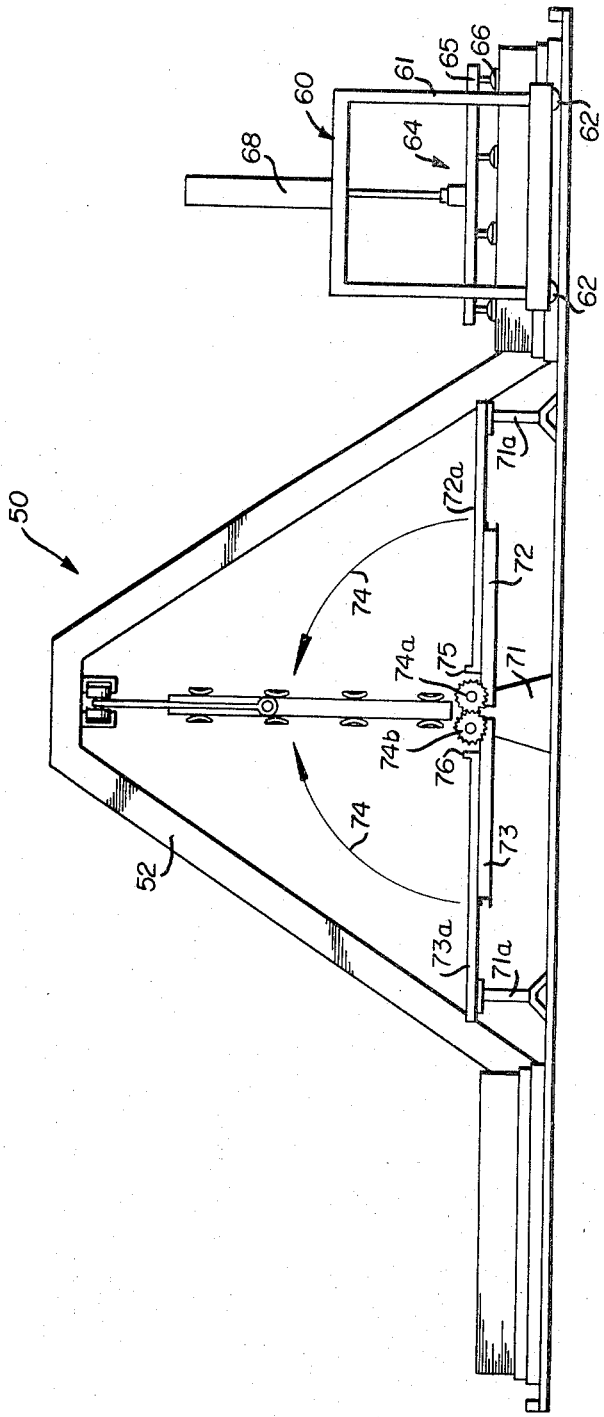
FIGURE 5 is a vertical section taken on the lines 5—5 of FIGURE 4, and showing the loading mechanism in end elevation.

Turning next to a detailed description of the flipper unit 70, and referring first to FIGURES 2 and 5, it will be noted that elongated base 71 thereof pivotally supports the marginal edge of lifting frames 72 and 73 with these frames supporting series of panel engaging arms 72a, 73a that are arranged in parallel for sheet supporting purposes with supports 71a, 71a being provided to properly support the lifting frames 72 and 73 and the support arms thereof in the lowered position shown in FIGURE 5 of the drawings. In this regard, the detailed mechanism required to move the lifting arms 72 and 73 in the direction of arrows 74, 74 is shown schematically, with it being apparent that meshed gears 74a, 74b can be driven by any appropriate type of driving mechanism so long as the same performs the function of moving the arms between the position of FIGURE 6, for example, and the position of FIGURE 9, for example.

It is also to be understood that the surfaces of the arms 72, 73 will be receiving the prime coated surfaces of the skin members, and accordingly, appropriate protective coverings are provided on such skin receiving surfaces of the arms 72 and 73 for the purpose of preventing marring of the primed surfaces. It will also be noted from FIGURE 5 that appropriate stops 75 and 76 are provided adjacent the pivoted edge of the arms 72 and 73 so as to properly align the skin members during the movement from the position of FIGURE 6 to the position of FIGURE 9, for example.

Turning now to the description of the vacuum loader 80 it has been previously observed that the function of this unit is to convey a pair of prepositioned aluminum skins from the loading area into a curing mold of the panel machine, with the unit 80 additionally serving the function of properly positioning such skins with respect to the curing mold so as to avoid misalignment of skins with respect to the foamed core that will subsequently be formed therebetween.

To this end and referring particularly to FIGURES 2, and 10 through 15, it will be noted that the unit 80 includes an expandable, rectangular, box-like unit 81 that has its opposed edges connected to depending support arms 82, 82 that have their upper ends appropriately received in overhead conveyor 51 so as to permit the unit 80 to slide into and out of the mold that is shown positioned in the loading station in FIGURE 2. The overhead conveyor 51 is supported in the just described elevated condition by the center post 116 of the panel machine 100 together with the usual support posts 52, 52 that are also shown in FIGURE 2 of the drawings.

Turning now to FIGURES 10 through 15, it will be first noted that the expandable box-like unit 81 is made up of a rectangular frame element 83 that defines the perimeter of the unit 81, with frame 83 receiving an inflatable bladder 84 as clearly shown in FIGURES 10 through 16 of the drawings. The bladder 84 just described is further enveloped by opposed closure members 85 and 86 that are preferably of identical configuration, with a plurality of guide rods 87, 87 extending transversely of the frame 83 so that their opposed ends may be received in appropriate openings 85a, 85a and 86a, 86a, that are respectively provided in the closure panels 85 and 86.

Figure 10:
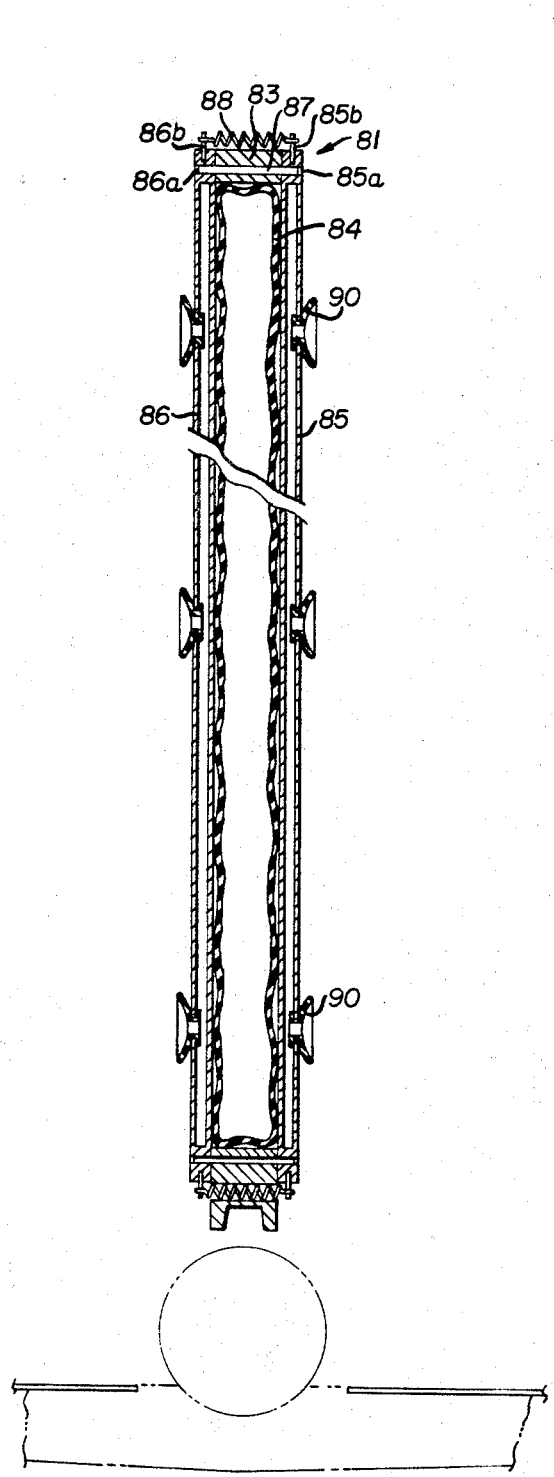
FIGURE 10 is a schematic sectional view taken on the lines 10—10 of FIGURE 2, and showing details with reference to the improved vacuum loader.

For the purpose of normally retaining the closure panels 85 and 86 in the position of FIGURE 10, one or more springs 88, 88 are shown interconnecting posts 85b and 86b that project beyond the periphery of the closure plates 85 and 86 respectively with a plurality of such springs 88 and posts 85b and 86b being provided around the perimeter of the unit 81.

Because the unit 80 must carry the skins from the loading area to the interior of the panel machine for the purposes that have been described, it is necessary that holding means must be provided for this purpose, and accordingly, the closure panels 85 and 86 are shown having a plurality of suction cups 90, 90 that connect to the hollow interior of the closure panels 85 and 86 so that upon the application of a vacuum pressure interiorly of said panels, a vacuum holding pressure will also be applied to the suction cups 90, 90. In this regard and because of the fact that this particular mode of applying vacuum pressure to suction cups just described is not believed to be of patentable significance per se, there has been no showing of the detailed manner in which such vacuum pressure is applied, with it being understood that such vacuum pressure to suction cups 90 can be applied in several known ways, such as with the use of a conduit interconnecting the hollow interior of the hollow panels 85 and 86, with a vacuum source of predetermined amount.

Similarly and with reference to the bladder 84, no detailed disclosure has been undertaken with reference to the manner of supplying pressure to the same to inflate the same and separate the closure plates as shown in FIGURE 13, for example, with it being understood that such inflation and/or subsequent relieving of pressure may be accomplished in any one of several known ways again including the use of a flexible conduit appropriately connected between the pressure source and the bladder 84, for example.

(c) *The panel making machine 100*

(1) *Background.*—It has been previously indicated that the panel making machine 100 is constructed in the general form of a merry-go-round so as to include a central hub portion that rotates around a given point and that has a series (eight are shown) of arms that each contain an identical curing mold. The machine is indexed 45 degrees during each sequence of operation, with the result that during each revolution of the machine, eight complete panels are produced.

The curing molds that are associated with each of the arms include, in each instance, a molding chamber per se, together with a steaming unit that is retracted during unloading and again inserted during the loading cycle so as to produce a source of steam for expanding the beads.

Accordingly, and against the above background, detailed description of the panel molding machine 100 will now be undertaken with the various component portions thereof being specifically described in separately identified sub-paragraphs.

(2) *The foundation structure.*—The foundation structure is best shown in FIGURES 4, 21, 27 and 28 of the drawings, as well as in the plan view shown in FIGURE 3 of the drawings.

Accordingly, and referring first to FIGURES 27 and 28, a main bearing ring 111 is shown provided with the usual roller bearings 112 that serve to rotatably support the main support 113, with a rigid octagonal hub framework 114 concentrically encircling and connecting to the support 113 so as to permit rotation of hub framework 114 around the axis of central support shaft 116.

In addition to the aforementioned structure, the foundation surface further includes an outer support surface 117 of circular configuration that serves to provide support for rails and track 117a (FIGURE 30) upon which the wheel elements 118, 118 that are provided on the outboard end of each rigid arm member 120 (see FIGURES 1, 4 and 30), with the inboard end of each arm member 120 being rigidly secured to the central hub 114 by the usual key and bolt arrangement that is illustrated schematically in FIGURE 26.

The foundation surface above described will normally be flat except for the provision of certain pit areas that are required for operation of the panel machine 100. The first of these pit areas is a pie-shaped pit area 121 that is provided beneath the unloading and loading stations for the purpose of permitting the probing elements to be retracted downwardly during the operations that occur at these two stations. Further, and although not shown in the drawings, a pit is provided beneath the steaming station so as to permit the steaming operation to occur at the appropriate time.

Additionally, and for the purpose of supporting the inner end of the conveyor 51 (see FIGURE 2), the central support shaft 116 projects upwardly to the point shown in FIGURE 2 where the same can serve as a point of support not only for the conveyor 51, but to additionally support the overhead conveyor unit O that carries the unloading mechanism for the panel machine.

In order that the device may possess the requisite rigidity during rotational movement, a series of outer support arms 122, 122, as well as inner support arms 122a, 122a are provided in interconnecting relationship between adjacent radiating arms, with this condition being clearly shown in FIGURE 2 of the drawings. In this fashion the actuating pistons for cracking the curing mold open at the unloading station can be properly supported on the connecting arms, as clearly shown in FIGURE 2 of the drawings.

(3) *The basic rotating structure and the drive mechanism therefor.*—It has been above indicated that in basic essence, the panel machine 100 includes a main hub 114 that rotates around the axis of rotation of support shaft 116 so that a series of radiating arms 120, 120 (eight being shown) can be moved in 45 degree increments to thus effectuate the simultaneous performance of eight operations during any one sequence of operation.

Accordingly, and with the basic operation having been established, reference is now made to FIGURES 2 and 30 for a detailed description of the drive and indexing means that causes the sequenced rotation above described.

Accordingly, and referring first to FIGURE 2, it will be noted that of the eight arms provided, driving means, generally designated by the numeral 130, are provided on the outboard ends of four alternate arms, so that the panel unit 100 is driven at four points by motors that cause the support wheels 118, 118 to be driven across the rail 117a, with the condition of individual drive being best shown in FIGURE 30 of the drawings.

Accordingly, and referring to FIGURE 30, it will be noted that a driving motor 131 is secured to the outer end of one arm 120 so as to drive a chain 132 that, in turn, rotates the wheel member 118, with the result that the entire unit will be driven by the motors 131, 131, of which there are four in number, with the motors being properly synchronized so as to effectuate the requisite driving movement in unison.

For the purpose of properly stopping the unit at a given exact position, the panel machine 100 further includes an indexing mechanism that is generally designated by the numeral 140 and shown best in FIGURE 30. This indexing mechanism 140 includes a supporting frame 141 that is firmly bolted to the floor by bolts 142, 142, so as to be strongly supported on the floor. A cylinder 143 is carried by the housing 141 and serves to reciprocate a locating pin 144 between the full and chain dotted line positions of FIGURE 30, with the housing 141 having a guide slot 141a within which a guide tab 144a of the pin member 150 may be located. This arrangement serves to limit the extent of the stroke effectuated.

In order that the pin 144 may properly locate the rotatable components of the said machine 100 at a predetermined point, the arm 120 further includes a cam roller unit that is generally designated by the numeral 145, with this unit 145 having rollers 146, 146 that are spaced from each other, as clearly shown in FIGURE 30 of the drawings. By use of the structure of this type, when the pin member 144, is extended to its full line position of FIGURE 30, the pointed nose portion 144b thereof will pass between the rollers 146, 146 and will shift the unit until proper alignment has been obtained.

In this regard, it is preferable that the motors 131, 131 will be used to stop the machine from rotation at an approximately correct position, with final indexing being accomplished by virtue of the indexing means 140 that have just been described.

(4) *The curing molds.*—Identical curing molds have been previously indicated as being associated with each arm 120, and in FIGURE 16 a schematic perspective view is presented showing the detailed construction of each such mold, with it being noted that all such molds are identically constructed so as to basically include a curing chamber 150 and a steam curing unit 150a that moves into and out of the curing chamber 150 by means that will be subsequently described.

Figure 16:
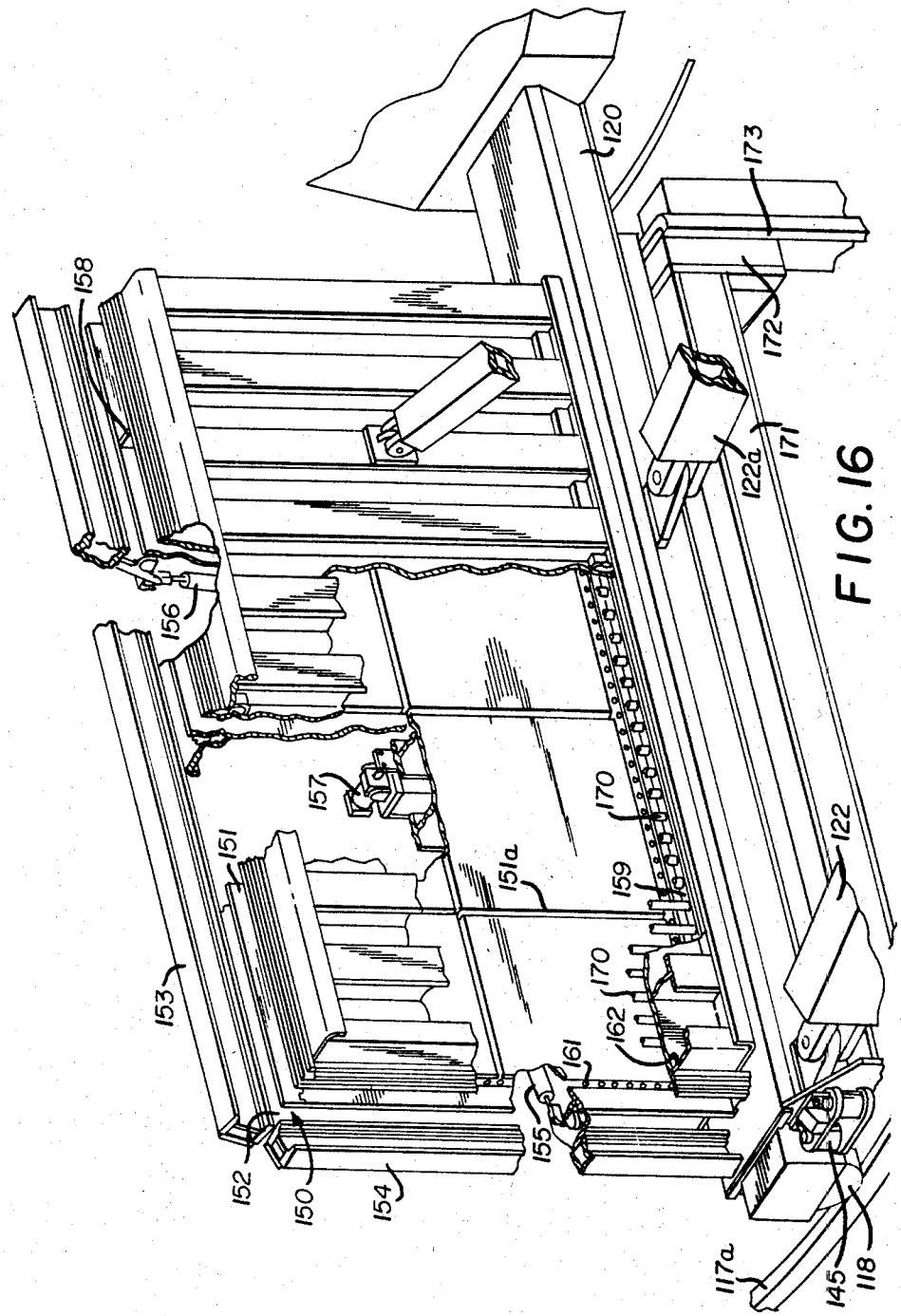
FIGURE 16 is a perspective, partly broken away and in section, and showing the structure of an individual curing mold.

Accordingly, and referring first to FIGURE 3 and FIGURES 16 through 20, it will be noted that the curing chamber 150 includes a fixed planar wall surface 151 and a moveable planar wall surface 152, with the fixed wall surface 151 further including a shiftable top cover 153 and a hinged outer end cover 154, with the end cover 154 being shifted by one or more pistons 155 while one or more pistons 156 similarly cause moving of the top cover 153 into and out of the position shown in FIGURE 16 of the drawings.

Further and as illustrated schematically in FIGURE 16, one or more pistons 157, 157 by being supported on arms 122, 122a (FIGURE 2) shift the moveable wall 152 around its pivot point between the positions of FIGURES 17 and 20 in known fashion.

The curing chamber 150 is further defined in each instance by an adjustable interior end wall 158 that may be shifted longitudinally of the wall sections 151 and 152 in the usual manner so as to control the length of the panel so produced, with the preferred form of the invention employing a shifting of wall 159 a distance of two feet, so as to produce either a 12′ or 14′ length panel, as desired.

The remaining component of each molding chamber 150 is the bottom wall 159 which is most clearly shown in FIGURES 16 through 20 as including a series of openings through which steaming units 170, 170 of steam probing unit 150a may be reciprocated, with the steaming units 170, 170 being secured to a manifold 169 that is raised or lowered with respect to the chamber 150 by a mechanism of the type shown in FIGURES 21, 24 and 25 of the drawings.

Referring again to FIGURE 16, it will be noted that the smooth walls on members 151 and 152 are both provided with a series of vacuum openings 161, 161 with these openings serving the purpose of providing vacuum pressure that will cause the aluminum skins delivered by vacuum loader 80 to be adhered against surfaces following withdrawal of the vacuum loader unit 80. In this regard, vacuum pressure is supplied to these openings 161, 161 through an outwardly presented manifold 162 that is associated with each of the members 151 and 152 for this purpose, with a detailed description of the mechanism for supplying such vacuum pressure being subsequently undertaken.

Further, and to the end of providing more over-all holding power, the walls of members 151, 152 are provided with right-angle slots 151a, 151a, with these slots serving as vacuum chambers that interconnect with vacuum openings 161, 161 upon application of the skin S to said surfaces.

Further, and for the purpose of providing insulation as aforementioned, the walls of the molds 151 and 152 are respectively coated with a liner of insulating material 151b and 152b, with this liner preferably provided thereon with a film of low friction material such as epoxy.

Before commencing a detailed description of the mechanism for raising and lowering the steaming units as above indicated, reference is first made to FIGURE 16 of the drawings where the raising and lowering mechanism is schematically indicated as including a rectangular box shaped frame member 171 that is connected at its outer ends to slide blocks 172, 172, that are in turn moved vertically in vertical ways 173, 173 that are provided in pit 121 (FIGURE 4), with these ways being radially aligned beneath the arm 120 that is shown in FIGURES 4 and 16 of the drawings.

In this regard, it should be first noted that two separate identical mechanisms are provided for lowering and raising frame members 171, 171, with one such mechanism being provided beneath the arm 120 that is positioned at the unloading station, while the other such mechanism is provided in longitudinal alignment beneath the arm located in the loading station, with this arrangement permitting the mechanisms beneath the unloading and loading stations to individually withdraw and reinsert the steaming units 170, 170 at the time the same are positioned in the unloading and loading stations.

Also, and although not shown, provision is made at the loading station to wipe the steaming units 170, 170 with a thin coat of oil as the same are reinserted between the mold walls following removal of the unit 80, with such arrangement preventing sticking between the units 170, 170 and the bead material, to thus result in easier withdrawal of steaming units 170, 170 when the unit 120 reaches the unloading station.

Against this background, reference is now made to FIGURE 21, wherein the slide blocks 172, 172 of frames 171, 171 are shown connected with the ends of chain members 174, 174, with chain members 174, 174 each being played around drive sprockets 175, 175 (see FIGURE 24) that extend from each drive sprocket to a gear unit 176 as is clearly shown in FIGURE 21. Preferably, the ends of the chain members 174, 174 are individually connected to blocks 172, 172, as shown in FIGURE 4, to permit more accurate adjustment of the support member 171.

By virtue of the above structure, it is believed apparent that the main support element 171 can be moved between the full and chain-dotted line positions of FIGURE 1 merely by operation of the drive gear 176, with it being noted that appropriate limit switches, fixed stops, and other controls will in all instances be provided in known fashion.

In addition to the aforementioned structure, each support element 171, 171 further includes a series of hook arms 177, 177 each of which is adapted to engage with depending lugs 178, 178 that extend downwardly beneath the manifold 169 as clearly shown in FIGURE 21. By this arrangement, the hook arms 177 can draw the probing mechanism down evenly as a complete unit. Additionally, rollers 179, 179 are provided on the upper surface of the member 171 for the purpose of providing support to the manifold 169, with such rollers engaging wear surfaces 180, 180 that are provided for this purpose on the lower edge of the just described manifold.

Figure 21A:
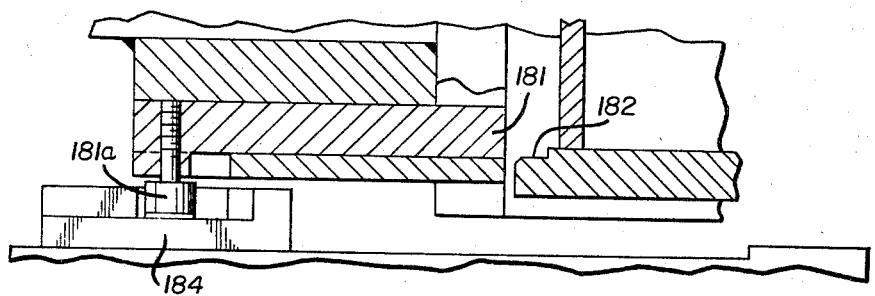
Figure 22:
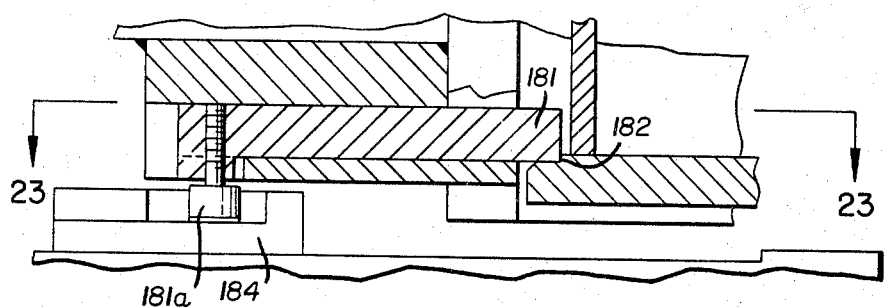
FIGURE 22 is a similar view but showing the cam in locked position.
Figure 23:
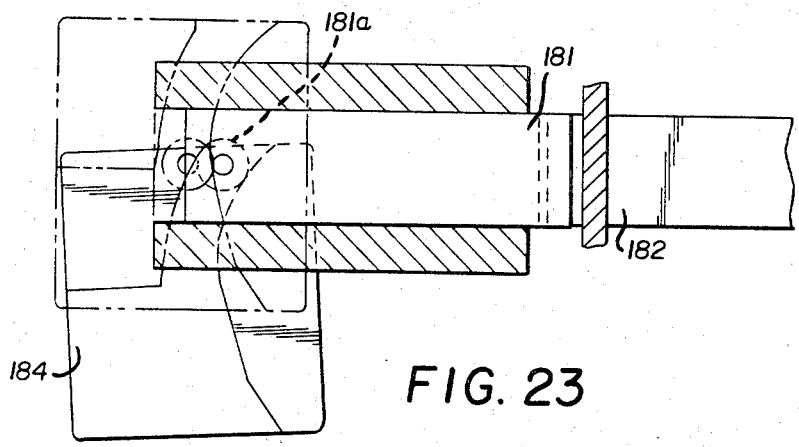
FIGURE 23 is a horizontal section taken on the lines 23—23 of FIGURE 22.

In order that the units 170, 170 and the components associated therewith may be locked in inserted position with respect to the chamber 150 during movement of such chamber through the subsequent stations where beading, steaming and curing operations are performed, there are provided locking means of the type shown best in FIGURES 21 through 23 of the drawings. These locking means include a slide key 181 that may be moved over the support surface 182 that is provided on the arm 120 with engagement of roller 181a with a cam track 184 serving to shift the key 181 in known manner, with the locking key 181 normally being in the locked position of FIGURE 22, but being moved by the cam track 184 to unlocked position of FIGURES 21, 21a when reciprocatory movement of the probing unit 150a is desired.

From the above described structure, it will be noted that provision has been made for providing a series of identical mold chambers that each have steam curing units associated therewith, with the description further showing how such probing units are normally retained in inserted position during the beading, probing, and cooling period, with provision being made for removing and reinserting the same during the unloading and loading cycles, respectively.

(5) *The bead supply mechnism.*—The bead supply mechanism is best shown in FIGURES 2 and 17 of the drawings, and in basic essence includes an elevated hopper 190 that is suported in elevated condition above the open upper end of the mold chamber 150 that is positioned below the same, with the unit 190 having a proper configuration of discharge opening so as to permit delivery of a predetermined charge of beaded material to the interior of the curing chamber 150, with this condition being shown in FIGURE 17 of the drawings.

In view of the fact that the hopper construction 190 is of standard construction, no detailed description of the same will be undertaken.

(6) *The vacuuming and steam supply systems.*—By way of background, it will recalled that vacuuming systems are required in two instances, with the first vacuuming system being required to produce a vacuum pressure in the chamber 162, so as to cause such vacuum to be passed through the opening 161 and thus cause adhesion of the skins to mold walls during formation of the panel unit. Vacuum is required in the second instance for the purpose of causing condensate to be removed from the interior of the core through the openings 170a, 170a that are provided in each of the steam cores 170, 170 that have been previously described, with it being noted that steam will have been previously supplied through these same openings 170a, 170a for the purpose of expanding the material into an expanded polystyrene core.

The vacuuming means per se are best shown in FIGURES 2, 26, 27, 28 and 29, with the figures showing that the vacuuming system, generally designated by the numeral 200 (FIGURE 2) includes three plenum chambers 201, 202 and 203 that are arranged on top of each other so as to respectively receive vacuum pressure from the vacuum pumps 204, 205 and 206, as best shown in FIGURE 29 of the drawings, with the just described vacuum pumps 204, 205 and 206 being carried on selected arms 120, 120 of machine 100 so as to be rotatable with the machine 100 as the same revolves, with the usual piping 207, 207 being provided to interconnect the just-described pumps with the just-described plenum chambers.

In this regard, it has been previously indicated that vacuum must be provided for on the mold walls and in the core interiors. In the regard, the lowermost vacuum chamber 201, shown best in FIGURES 27 and 28, receives, as above indicated, vacuum pressure from the vacuum pump 204, with the line 207 extending downwardly through the aligned opening 202a, 203a that are provided in the uppermost chambers 202 and 203 (see FIGURE 29).

Next referring to FIGURE 26, it will be noted that eight conduits 210, 210 radiate outwardly from the bottom plenum chamber 201 so as to supply a vaccum pressure to the manifold 169, with the fitting 211 connecting to the vacuum chamber 212 for applying vacuum pressure with respect to the interior of core 170, with this arrangement being best shown in FIGURE 24 of the drawings.

Accordingly, the lower chamber 201 will supply vacuum pressure to the eight arms 120, 120 through the medium of the connecting conduits 210, 210 as above described.

The remaining two upper vacuum chambers 202 and 203 (see FIGURES 27 and 28) are each designed to supply vacuum pressure to the mold walls of four molding units carried by four alternate arms 120, 120. This arrangement provides two independent vacuuming systems so that the loss of vacuum at the unloading station will not have a detrimental effect on the vacuum pressure simultaneously being applied at the loading station and vice versa.

Accordingly, it will be assumed that the four series of connecting conduit fittings 215, 215 radiate at right angles to each other from the lower unit plenum chamber 202 to supply vacuuming pressure to the mold walls of four arms 120, 120, while four identically contoured connector fittings 216, 216 radiate at right angles to each other from the upper plenum chamber 203 to supply vacuum to the mold walls of the remaining four arms 120, 120.

To avoid interference, the connector fittings 215 and 216 are arranged at different elevations, as clearly shown in FIGURES 24, 27 and 28 of the drawings.

For the purpose of initiating and terminating vacuum during any given time, the foundation structure further includes a pair of concentric cam rings 226 and 227 that are respectively engaged by the roller elements of control valves 228, 229 with said valves serving to initiate or terminate vacuum pressure to any given mold chamber 150. In this regard, it will be noted that cam ring 226 will move the control elements 228, 228 up or down into open or closed relationship with reference to the various port openings of the chambers 202 and 203 (FIGURE 27) while cam ring 227 will move control valves 229 similarly so as to control the application of vacuum from chamber 201, with this arrangement being best shown in FIGURES 27 and 28 of the drawings.

The equipment for supplying steam to the interior of the cavity 150 during the time that said cavity is positioned at the steaming station is best shown in FIGURES 21 and 25 of the drawings, wherein a steam supply line 220 is shown movable by separate control means into and out of engagement with the connector fitting 225 so as to unseat the valve 225a thereof and permit the ingress of steam into the chamber 169. A baffle plate 225b is provided in chamber 169 for the purpose of deflecting condensate that enters with the steam through fitting 220.

(7) *The unloading mechanism.*—The mechanism employed for removing the completed panel from the panel machine 100 has been previously indicated as including an overhead conveyor system O that is supported on the post 116 as shown best in FIGURE 2 of the drawings.

For the purpose of effectuating such removal, carrier elements (not shown) are provided on such conveyor and include a depending cork screw 230 of the type shown in FIGURE 20, with known mechanism (not shown) being provided to rotate this cork screw during lowering of the same so as to cause the same to penetrate the cured core as shown in FIGURE 20. At this time, and with the movable wall 152 having been tilted back as shown in FIGURE 20, the carrier elements may be lifted upwardly to remove the cured panel P from the mold, followed by movement of the same along the conveyor track for subsequent finishing operations that will be described in ensuing portions of this specification.

(d) Panel finishing and storage

Referring once again to FIGURE 1 of the drawings, and assuming that a panel P has been completely manufactured as above indicated, the production of a complete panel nonetheless requires the performance of certain additional functions, and accordingly, it will be noted from FIGURE 1, the completed panel being unloaded in the direction of arrow 60 (FIGURE 1) now passes to the sorting station 70 wherein the panel can be located according to size and color to be painted. Following this, the same overhead conveyor system takes the panels through a final spray station 71 and then conveys the same to a finishing station 71a where minor flaws or dimensional correction are effectuated.

Following this, the panels are delivered to storage area 72 whereupon the empty carrier elements can return to the panel machine in the direction of arrow 73.

(H) OPERATION OF THE DEVICE

(a) Treatment of the aluminum skins

As has been previously indicated, the over-all operation of producing aluminum panels of the type herein described envisions the pretreatment of the aluminum skin surfaces so as to provide the same with a painted prime coat on one face, and an adhesive bonding coat on the other face thereof, with this arrangement resulting in a primed panel that is firmly bonded to the core of polystyrene.

Accordingly, and as shown in FIGURE 1, each skin is successively conveyed along the conveyor line so that its exposed face is first properly provided with a primed coat. Following this, the skin is turned over 180° whereupon the exposed face receives an adhesive coating.

Once the surfaces so described have been so treated, the skins are then sorted into storage piles dependent on size.

(b) Positioning of the treated skins for loading into the panel machine

From the storage racks 41a and 41b, the loading mechanism 50 will position the skins in upright relationship to each other so as to permit insertion of the same into the panel machine 100, with this sequence of events being best shown in FIGURES 6 through 9 of the drawings wherein skins S are being transferred from storage rack 41b to the opposed arms 72a and 73a of the flipper mechanism 70 through the medium of a transfer crane 60.

Figure 11:
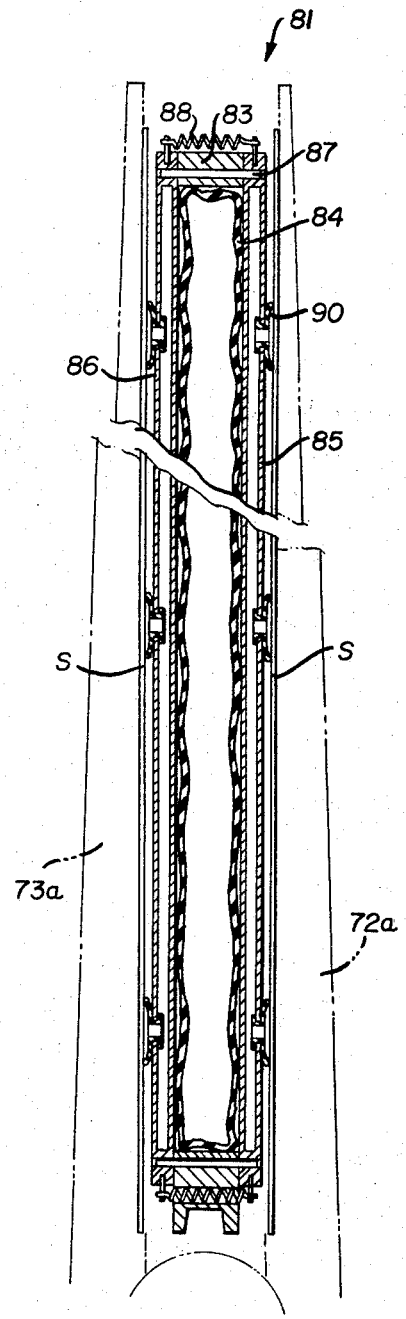
FIGURE 11 is a view similar to that of FIGURE 10, but showing the aluminum skin members being carried by the vacuum loader and entering the appropriate curing mold of the panel making machine that is positioned at the load station.
Figure 14:
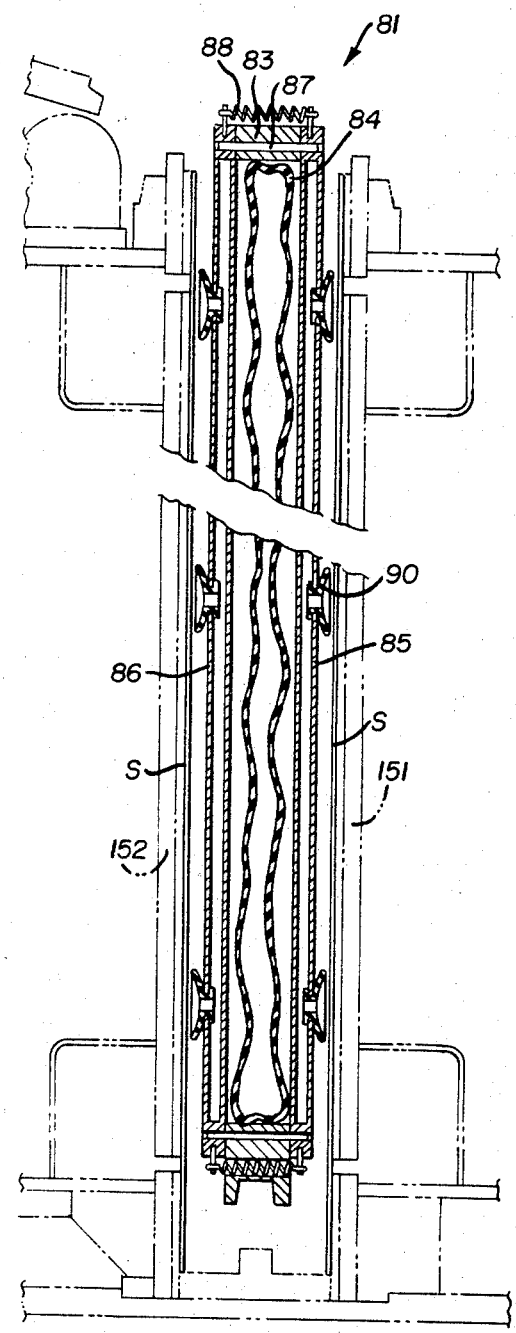
FIGURE 14 is a view similar to FIGURE 13 but showing the vacuum loader being collapsed and being withdrawn from the curing mold.
Figure 15:
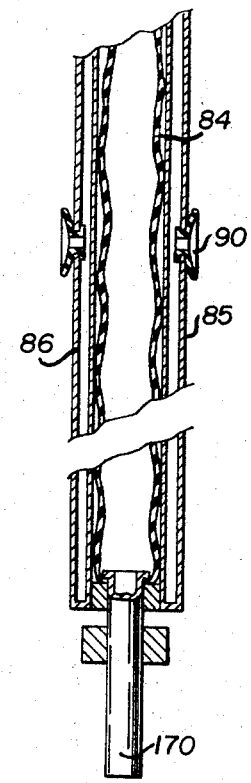
FIGURE 15 is a section taken on the lines 15—15 of FIGURE 4 and showing details of the vacuum loading means.

When the arms 72a and 73a come in alignment with the suction cups 90, 90 that are provided on the opposed faces of the vacuum loader 80, it is apparent that vacuum may then be applied to the cups 90, 90 to cause the skin sheets S to be adhered thereto, with this condition of component parts being clearly shown in FIGURE 11 of the drawings.

Figure 6:
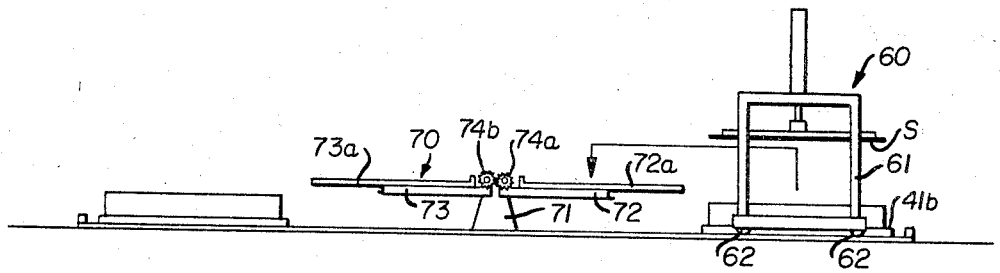
FIGURES 6, 7, 8 and 9 are schematic views showing various positions of the aluminum skin members during loading into the paneling machine.
Figure 7:
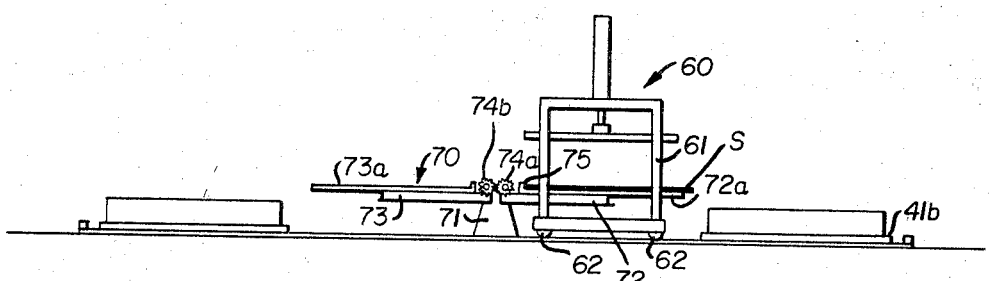
Figure 8:
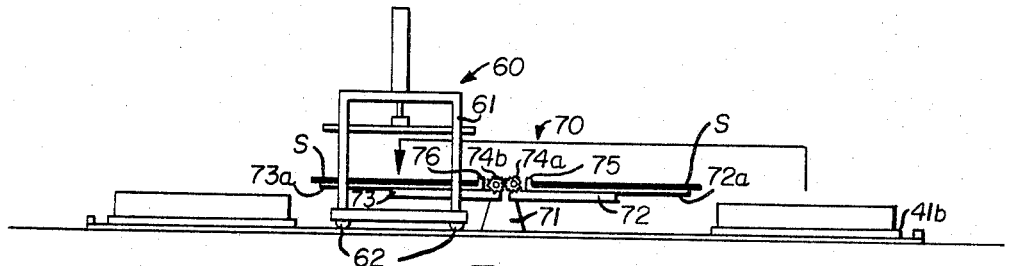
Figure 9:
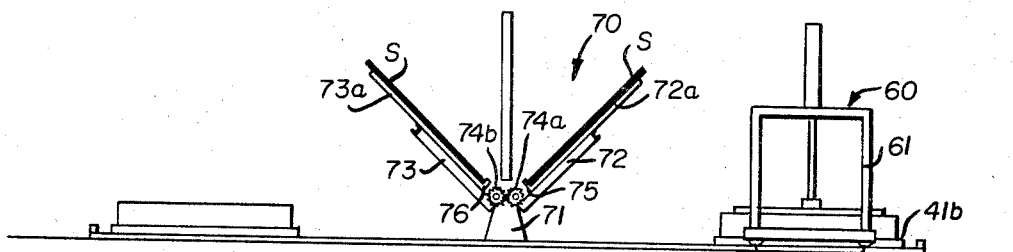

Once the adherence above described has taken place, the arms 72 and 73 may be retracted to the position of FIGURE 6. At this time, the unit 80 may be moved longitudinally along the conveyor 51 so as to position the unit 80 and the skins attached thereto between the plates 151 and 152 of the curing mold 150, with this position of component parts being shown in FIGURE 12. In this regard, it will be noted that the cups 90, 90 are adhered to the adhesive coated face of the skins S.

At this time, the entire unit 80 may be slightly dropped in position to thus properly align the skins S with the lower wall of the mold chamber 150, whereupon the bladder 84 may be expanded to cause separation of the closure panels 85 and 86 to the position shown in FIGURE 13. At this time, vacuum may be applied through the openings 161, 161 of the mold chamber 150, and when such vacuum has been applied, the vacuum of pressure may be released from cups 90, 90, and the pressure interiorly of the bladder 84 may be relieved, whereupon the unit 80 will contract to the position of FIGURE 14. At this time, the unit 80 may be raised and withdrawn for loading with another series of skins as just described.

(c) The steaming operation

At this time, it will be noted that the skins S, S just described have their painted surfaces adhered by vacuum to the smooth wall surfaces of the panel members 151 and 152, with it being noted that the loading element 80 has been withdrawn. At this time, and referring to FIGURES 4 and 21, the probing unit 150a will be in the chain-dotted line position of FIGURE 21, having previously been lowered to such position during the unloading cycle. Accordingly, at this time, the unit 150a may be raised by operation of the drive unit 176 which will cause movement of the member 171 upwardly to the full-line position of FIGURE 21. Such upward movement results in an equivalent upward movement of the manifold 169 and the steaming elements 170, 170 that are associated therewith. Finally, the end wall 154 is moved by piston 155 (FIGURE 16) to closed position so that as the arm 120 swings out of the loading position shown in FIGURE 16, only the upper door 153 will be opened, with this position being best shown in FIGURE 17 of the drawings.

Accordingly, at this time, the just described mold chamber 150 will have been indexed to the beading station which is indicated by the numeral 300 on FIGURE 1 of the drawings, with the numeral 200 being used to designate the loading station, while the numeral 400 will be subsequently employed to indicate the steaming station. The numeral 500 is cumulatively applied to the four cooling stations, while the numeral 600 is utilized in FIGURE 1 to designate the unloading station.

(d) The beading operation

The beading operation as shown in FIGURE 17 merely involves the release from hopper 190 of a predetermined charge of preexpanded polystyrene beads that fill the chamber 150 to the level indicated in FIGURE 17.

(e) The steaming operation

Following supplying of beads as just described, the machine 100 is again indexed to the steaming position shown in FIGURE 18, and at this time, steam is being introduced to the interior of the now closed chamber 150 through the openings 170a, 170a that are provided in the probing elements 170, 170, with steam being supplied by virtue of fitting 220 having engaged fitting 225, with the position of the component parts at this time being shown in the chain-dotted position of FIGURE 25. The extent of steaming will be dictated by the back pressure developed in the manifold 169. Accordingly, when the back pressure is of the appropriate amount, the steaming operation will terminate, whereupon vacuum will exhaust condensate through fitting 211 and chamber 212 (FIGURE 24).

(f) The cooling operation

The cooling operation, requiring a greater period of time, conveniently occupies four sequences of operation so that the length of cooling required does not control the operating cycle of the panel machine. Accordingly, cooling and vacuuming as shown in FIGURES 27 and 28 occur at stations marked 500, with such cooling serving to remove the condensate and completely cure the polystyrene core.

(g) Removal of the panel

When the mold chamber 150 has reached the unloading station 600, the component parts will be positioned as shown in FIGURE 20 of the drawings, wherein the carrier elements that depend from overhead conveyor O have descended while rotating to cause the cork screw elements 230, 230 to be imbedded in the exposed upper portion of the core of the panel unit P. At this time, the piston 157 may be operated to tilt the movable wall 152 to the position of FIGURE 20 at which time upward movement of the cork screw 230 and the parts supporting the same will cause the panel P to be lifted clear of the molding chamber 150, with it first being noted that the end door 154 (FIGURE 16) will have first been opened to facilitate longitudinal removal of the panel in the direction of arrow 700 (FIGURES 1 and 3).

(H) SUBSEQUENT OPERATIONS

Following removal of the panel as previously indicated, the completed panel will be sorted for size and color requirements followed by such subsequent finishing operations as may be required.

Following this, the panel may be delivered to storage.

(I) SUMMARY

It will be seen from the foregoing that there has been provided a new and improved device for producing an improved laminated panel that features mass production of wall panels that are completely finished upon reaching the storage area for the same. It has also been shown how the panel machine is the key to the operational sequence of events that have been described, with this machine permitting, for the first time, mass production of such panels on an automatic basis.

(J) MODIFICATIONS

As has been previously indicated, the panel making machine is intended to make a laminated panel of predetermined size, with the process that has been disclosed illustrating a panel that will be approximately 8 feet high by 4 inches deep by either 12 or 14 feet in length. Preferably, the skin material is aluminum material that has a thickness of approximately .025 to .032 inch, while the core material has preferably been illustrated as polystyrene bead that has been preexpanded in the preferred form of the invention illustrated. It is to be understood, however, that the novelty herein shown is not to be restricted in any way to the specific embodiment shown, with the use of other materials of other thickness, etc., being contemplated.

Accordingly, while a full disclosure of the invention has been set forth in accordance with the dictates of the patent statutes, it is to be understood that modifications of the invention may be resorted to without departing from the spirit hereof or the scope of the appended claims.

What is claimed is:

1. A method of manufacturing a wall panel defined by a block of expanded polystyrene bead material having the adhesive coated faces of opposed thin aluminum sheets attached to opposed faces thereof, comprising the steps of:
   (a) progressively advancing a series of thin aluminum skin members through surface treating equipment that prepares one surface of each said skin;
   (b) baking a prime paint coat on said prepared surface;
   (c) removing said prime skin members from said first conveyor and flipping the same 180° onto a second aligned conveyor so as to present the untreated surface thereof in accessible position;
   (d) providing an adhesive coating on said now accessible surface and cooling the same to non-tacky condition;
   (e) shifting pairs of identical sized skins into upright parallel relationship with each other with said adhesive coated faces facing each other in spaced relationship;
   (f) surrounding said spaced skins with a mold to define a hollow cavity, the opposed major planar walls of which are defined by said adhesive coated surface of said skin;
   (g) filling at least a portion of said hollow chamber with expandable polystyrene bead material;
   (h) closing said chamber to atmosphere and expanding said enveloped expandable polystyrene into fully expanded condition within said chamber by use of heat sufficient enough to fully expand said polystyrene while simultaneously reactivating said adhesive coat whereby said expanded polystyrene is bonded to said skins at the point of contact therebetween;
   (i) removing said laminated panel from said molding apparatus.

2. The method of claim 1 further characterized by the steps of inserting hollow perforated steam core members into place between said skins prior to said bead filling operation and withdrawing the same following cooling and just prior to said panel removal operation whereby voids are molded into the core of said panel.

3. Apparatus for manufacturing a wall panel of the character described, comprising:
   (a) first conveyor means adapted to progressively advance thin aluminum skin members;
   (b) surface treating means adapted to prepare one surface of skin members moving across said first conveyor means;
   (c) painting means adapted to prime coat said prepared surface, with the skins moving across said first conveyor means;
   (d) skin flipper means adapted to remove said skins from said first conveyor means and rotate the same 180 degrees, whereby the untreated surface thereof is upwardly presented;
   (e) second conveyor means receiving the treated surface of said skins and progressively advancing the same with the untreated face being accessible;
   (f) adhesive means adapted to apply adhesive coating to the untreated surface of said skins as the same advances across said second conveyor means;
   (g) second flipper means adapted to receive skins from the discharge end of said second conveyor means and position a pair of said skins in upright parallel relationship to each other, with said adhesive coated surfaces of said pair of skins facing each other;
   (h) a panel making machine, including a foundation and a series of panel curing molds that are movable relatively thereof in a closed cyclic path of movement;
- (i) panel loading means supported on said foundation and adapted to transfer said pair of upright positioned skins into said curing mold when the same is positioned at the loading station of said panel making machine;
- (j) means supported by said foundation for supplying expandable bead material between said skins received in said curing mold;
- (k) steaming means carried by each said panel curing mold and being operable to expand said bead material between said skin members while simultaneously reactivating said adhesive coating, whereby said expanded material is bonded to said skin material;
- (l) and unloading means supported by said foundation for removing said cooled panels from said panel machine when said curing mold is positioned at said unloading station.

4. A loading device for panel skins of the character described, comprising:
- (a) a frame defining an opening;
- (b) an inflatable bladder received in said opening;
- (c) at least one closure panel shiftably carried by said frame and at least partially closing said opening;
- (d) resilient means normally urging said closure panel towards said frame;
- (e) said bladder shifting said closure panel away from said frame during inflation thereof;
- (f) skin holding means, carried by and projecting outwardly from said closure panel and adapted to hold and support a skin against the force of gravity during movement of said device.

References Cited

UNITED STATES PATENTS

| | | | |
|---|---|---|---|
| 3,013,833 | 12/1961 | Gwin et al. | 294—65 |
| 3,285,433 | 11/1966 | Beneke et al. | 294—65 XR |
| 1,959,216 | 5/1934 | Owen | 214—1 X |
| 2,412,138 | 12/1946 | Fink | 118—324 X |
| 3,015,132 | 1/1962 | Bunting | 264—51 |
| 3,042,967 | 7/1962 | Edberg | 18—5 |
| 3,057,007 | 10/1962 | Vanden Berg | 264—45 X |
| 3,075,240 | 1/1963 | Casacinvina et al. | 264—45 X |
| 3,159,943 | 12/1964 | Sugar et al. | 52—309 X |
| 3,166,202 | 1/1965 | Arnold | 214—1 |
| 3,185,587 | 5/1965 | Sullivan | 117—68 |
| 3,202,532 | 8/1965 | Labombarde | 117—68 X |
| 3,203,042 | 8/1965 | Axelsson | 18—5 X |
| 3,214,794 | 11/1965 | Otis | 18—5 |
| 3,257,484 | 6/1966 | Barnette | 264—45 X |

OTHER REFERENCES

Koppers Bulletin: "Technical Manual Dylite Expandable Polystyrene"; "Mold Techniques and Mold Design," Bulletin C–9–273. Chapter 3e, Nov. 15, 1959, pp. 11 and 12.

Franson, G. R.: "Fabrication Methods for Expandable Polystyrene," in Plastics Technology, July 1956, pp. 452–455.

JULIUS FROME, *Primary Examiner.*

PHILIP E. ANDERSON, *Assistant Examiner.*